(12) United States Patent
Mori et al.

(10) Patent No.: US 9,285,987 B2
(45) Date of Patent: Mar. 15, 2016

(54) OPERATING DEVICE AND IMAGE FORMING APPARATUS WITH DISPLAY FORMAT RECEIVER FOR RECEIVING INSTRUCTIONS FROM A USER FOR SELECTING A DISPLAY FORMAT

(75) Inventors: Nobuyasu Mori, Osaka (JP); Takanori Miyamoto, Osaka (JP); Tetsuya Maeda, Osaka (JP); Dai Shigenobu, Osaka (JP)

(73) Assignee: KYOCERA MITA CORPORATION (JP)

( * ) Notice: Subject to any disclaimer, the term of this patent is extended or adjusted under 35 U.S.C. 154(b) by 630 days.

(21) Appl. No.: 12/872,064

(22) Filed: Aug. 31, 2010

(65) Prior Publication Data
US 2011/0055719 A1 Mar. 3, 2011

(30) Foreign Application Priority Data

Aug. 31, 2009 (JP) .................. 2009-200957
Aug. 31, 2009 (JP) .................. 2009-200958
Aug. 31, 2009 (JP) .................. 2009-200959

(51) Int. Cl.
*G06F 3/00* (2006.01)
*G06F 3/0488* (2013.01)
(Continued)

(52) U.S. Cl.
CPC .......... *G06F 3/04886* (2013.01); *G06F 3/0483* (2013.01); *G06F 3/04847* (2013.01); *G06F 9/4446* (2013.01); *G06Q 30/0281* (2013.01)

(58) Field of Classification Search
CPC ... G06F 9/4446; G06F 3/0482; G06F 3/0483; G06F 3/04847; G06F 3/04886; G06Q 30/0281

USPC .................................................. 715/747, 746
See application file for complete search history.

(56) References Cited

U.S. PATENT DOCUMENTS 5,542,024 A * 7/1996 Balint .................... G06N 5/022
706/60
5,859,637 A * 1/1999 Tidwell, II ............ G06F 9/4446
715/708

(Continued)

FOREIGN PATENT DOCUMENTS

CA 2434061 A1 * 6/2002 ................ G06F 8/61
EP 2141588 A1 * 1/2010 ................ G06F 8/30

(Continued)

OTHER PUBLICATIONS

Bing search q=choose+wizard+menu+table&src+IE-Se Dec. 4, 2015.*

(Continued)

*Primary Examiner* — Jeffrey A Gaffin
*Assistant Examiner* — John M Heffington
(74) *Attorney, Agent, or Firm* — Gerald E. Hespos; Michael J. Porco; Matthew T. Hespos

(57) ABSTRACT

A multi function peripheral is provided with a display controller for causing a display section to display reception screens for respective settings on functions executable in the electrical apparatus, an instruction receiver for receiving an instruction to designate a content of each setting from the user, a display format receiver for receiving an instruction to select any one of a wizard display format, a list display format and a menu display format from the user, and a storage for storing the display format received by the display format receiver while relating it to the contents of the respective settings received by the instruction receiver.

8 Claims, 20 Drawing Sheets

(51) Int. Cl.
*G06F 3/0483* (2013.01)
*G06F 3/0484* (2013.01)
*G06Q 30/02* (2012.01)
*G06F 9/44* (2006.01)

(56) References Cited

U.S. PATENT DOCUMENTS

| | | | | |
|---|---|---|---|---|
| 5,877,765 | A * | 3/1999 | Dickman | G06F 3/0481 715/738 |
| 5,980,096 | A * | 11/1999 | Thalhammer-Reyero | G05B 17/02 |
| 6,026,417 | A * | 2/2000 | Ross | G06F 17/24 707/999.003 |
| 6,066,182 | A * | 5/2000 | Wilde | G06F 8/61 709/220 |
| 6,175,363 | B1 * | 1/2001 | Williams | G06F 3/0481 709/223 |
| 6,460,089 | B1 * | 10/2002 | Romano | G06F 9/543 719/310 |
| 6,477,435 | B1 * | 11/2002 | Ryan | G05B 19/0426 700/182 |
| 6,502,234 | B1 * | 12/2002 | Gauthier | G06F 8/34 717/101 |
| 6,564,375 | B1 * | 5/2003 | Jiang | G06F 9/4446 707/999.103 |
| 6,574,791 | B1 * | 6/2003 | Gauthier | G06F 9/4446 717/107 |
| 6,608,650 | B1 * | 8/2003 | Torres | H04N 5/232 348/231.3 |
| 6,714,219 | B2 * | 3/2004 | Lindhorst | G06F 8/34 715/746 |
| 6,854,111 | B1 * | 2/2005 | Havner | G05B 19/0426 700/17 |
| 6,859,924 | B1 * | 2/2005 | Kroening | G06F 8/60 717/173 |
| 6,903,723 | B1 * | 6/2005 | Forest | A61F 4/00 345/157 |
| 6,944,622 | B1 * | 9/2005 | Mitchell | G06Q 10/103 |
| 6,983,227 | B1 * | 1/2006 | Thalhammer-Reyero | G05B 17/02 345/419 |
| 7,062,532 | B1 * | 6/2006 | Sweat | G06Q 10/06 709/205 |
| 7,272,783 | B2 * | 9/2007 | Bauchot | G06F 17/246 707/999.102 |
| 7,290,215 | B2 * | 10/2007 | Bybee | G06F 9/4446 715/744 |
| 7,356,773 | B1 * | 4/2008 | Barraclough | G06F 8/30 715/705 |
| 7,363,309 | B1 * | 4/2008 | Waite | G06F 17/30392 |
| 7,366,993 | B2 * | 4/2008 | Joffrain | G06F 3/0486 345/440 |
| 7,512,906 | B1 * | 3/2009 | Baier | G06F 9/4443 700/83 |
| 7,593,885 | B2 * | 9/2009 | Du Preez | G06Q 30/06 705/37 |
| 7,624,375 | B2 * | 11/2009 | Santori | G06F 8/38 715/717 |
| 7,676,763 | B2 * | 3/2010 | Rummel | G06F 3/0482 715/810 |
| 7,926,030 | B1 * | 4/2011 | Harmon | G06F 9/4446 717/121 |
| 7,966,575 | B1 * | 6/2011 | Jetha | G06F 3/0482 715/775 |
| 8,161,375 | B2 * | 4/2012 | Berger | G06F 17/248 715/235 |
| 8,321,847 | B1 * | 11/2012 | Garvin | G06F 8/31 717/108 |
| 8,365,077 | B2 * | 1/2013 | Sakakibara | H04N 1/00408 715/705 |
| 8,521,857 | B2 * | 8/2013 | Maxwell | G06F 3/147 709/203 |
| 8,756,526 | B2 * | 6/2014 | Gador | 715/201 |
| 8,949,382 | B2 * | 2/2015 | Cornett | H04L 41/0806 709/220 |
| 8,972,859 | B2 * | 3/2015 | Saoumi | G06F 9/4446 715/705 |
| 8,977,951 | B2 * | 3/2015 | Ethier | G06F 3/0484 715/222 |
| 8,990,688 | B2 * | 3/2015 | Lee | G06F 3/011 715/706 |
| 9,009,585 | B1 * | 4/2015 | Chetrit | G06F 9/24 715/221 |
| 2002/0078103 | A1 * | 6/2002 | Gorman | G06F 8/34 715/234 |
| 2002/0129004 | A1 * | 9/2002 | Bassett | G06Q 30/02 |
| 2002/0136224 | A1 * | 9/2002 | Motley | H04L 12/4604 370/401 |
| 2002/0183982 | A1 * | 12/2002 | Rauscher | G06Q 10/06 703/1 |
| 2003/0009710 | A1 * | 1/2003 | Grant | G05B 19/19 714/37 |
| 2003/0023626 | A1 * | 1/2003 | Bretti | G06F 17/243 715/223 |
| 2003/0067487 | A1 * | 4/2003 | Kohls | G06F 17/50 715/764 |
| 2003/0081002 | A1 * | 5/2003 | De Vorchik | G06F 8/38 715/762 |
| 2003/0115333 | A1 * | 6/2003 | Cohen | G06F 17/3089 709/227 |
| 2003/0120711 | A1 * | 6/2003 | Katz | G06F 8/34 718/106 |
| 2003/0163298 | A1 * | 8/2003 | Odom | G06F 9/4411 703/21 |
| 2003/0172124 | A1 * | 9/2003 | Feinleib | G06Q 30/02 709/217 |
| 2004/0032433 | A1 * | 2/2004 | Kodosky | G06F 3/04817 715/810 |
| 2004/0130572 | A1 * | 7/2004 | Bala | G06F 9/4446 715/762 |
| 2004/0135802 | A1 * | 7/2004 | Allor | G06F 9/4446 715/705 |
| 2004/0186598 | A1 | 9/2004 | Tanaka | |
| 2004/0205529 | A1 * | 10/2004 | Poulose | G06F 17/243 715/205 |
| 2004/0243943 | A1 * | 12/2004 | Matsumoto | G06F 3/0482 715/841 |
| 2004/0255269 | A1 * | 12/2004 | Santori | G06F 8/38 717/109 |
| 2005/0011967 | A1 * | 1/2005 | Skelton-Becker | G05B 9/02 239/101 |
| 2005/0166179 | A1 * | 7/2005 | Vronay | G06Q 10/00 717/105 |
| 2005/0193001 | A1 * | 9/2005 | Shoham | G06F 9/4446 |
| 2005/0231520 | A1 * | 10/2005 | Forest | A61F 4/00 345/581 |
| 2005/0256844 | A1 * | 11/2005 | Cristol | G06Q 10/00 |
| 2006/0004854 | A1 * | 1/2006 | Okunseinde | G06F 17/30557 |
| 2006/0008239 | A1 * | 1/2006 | Huang | G11B 27/034 386/281 |
| 2006/0098685 | A1 * | 5/2006 | Mase | H04L 67/36 670/467 |
| 2006/0229995 | A1 * | 10/2006 | Ferraro | G06Q 20/383 705/74 |
| 2006/0242180 | A1 * | 10/2006 | Graf | G06F 17/30917 |
| 2007/0053367 | A1 * | 3/2007 | Tyebji | H04W 88/16 370/401 |
| 2007/0129947 | A1 * | 6/2007 | Agapi | G06F 11/3688 704/257 |
| 2007/0192734 | A1 * | 8/2007 | Berstis | G06F 3/0481 715/808 |
| 2007/0250783 | A1 * | 10/2007 | Wu | G06F 17/243 715/762 |
| 2007/0288843 | A1 * | 12/2007 | Makino | G06F 17/212 715/243 |
| 2008/0030463 | A1 * | 2/2008 | Forest | A61F 4/00 345/156 |
| 2008/0039173 | A1 * | 2/2008 | Walther | G06Q 20/40 463/17 |
| 2008/0039196 | A1 * | 2/2008 | Walther | G07F 17/32 463/27 |
| 2008/0052278 | A1 * | 2/2008 | Zlotin | G06Q 30/02 |
| 2008/0098291 | A1 * | 4/2008 | Bradley | G06F 17/243 715/223 |

(56) References Cited

U.S. PATENT DOCUMENTS

| | | | |
|---|---|---|---|
| 2008/0126963 A1* | 5/2008 | Kim | G06F 9/4411 715/764 |
| 2008/0189147 A1* | 8/2008 | Bartlett | G06Q 10/02 705/6 |
| 2008/0228819 A1* | 9/2008 | Minnis | G06F 17/30867 |
| 2008/0244402 A1* | 10/2008 | Sakakibara | H04N 1/00408 715/708 |
| 2008/0244439 A1 | 10/2008 | Oguri et al. | |
| 2009/0009803 A1 | 1/2009 | Takeuchi et al. | |
| 2009/0064025 A1* | 3/2009 | Christ | G06Q 10/10 715/772 |
| 2009/0094542 A1* | 4/2009 | McKelvey | G06Q 10/00 715/765 |
| 2009/0245603 A1* | 10/2009 | Koruga | A45D 44/00 382/128 |
| 2009/0254399 A1* | 10/2009 | Cristol | G06Q 30/02 705/7.36 |
| 2010/0070945 A1* | 3/2010 | Tattrie | G06F 8/20 717/101 |
| 2010/0076853 A1* | 3/2010 | Schwarz | G06Q 20/12 705/15 |
| 2010/0100408 A1* | 4/2010 | Dion | G06Q 10/0637 705/7.36 |
| 2010/0185064 A1* | 7/2010 | Bandic | A61B 5/0059 600/306 |
| 2010/0188505 A1* | 7/2010 | Iwanaga | G06K 9/00771 348/143 |
| 2010/0281360 A1* | 11/2010 | Arakane | G06F 3/0482 715/244 |
| 2011/0040390 A1* | 2/2011 | Blevins | G05B 19/0426 700/18 |
| 2011/0088011 A1* | 4/2011 | Ouali | G06F 8/10 717/105 |
| 2011/0098674 A1* | 4/2011 | Vicente | A61M 5/14244 604/504 |
| 2011/0106681 A1* | 5/2011 | Cockerell | G06Q 10/06 705/35 |
| 2011/0214089 A1* | 9/2011 | Jetha | G06F 3/0482 715/804 |
| 2011/0270842 A1* | 11/2011 | Dettinger | G06F 17/30398 707/741 |
| 2011/0300912 A1* | 12/2011 | Kim | G06F 3/04886 455/566 |
| 2013/0198628 A1* | 8/2013 | Ethier | G06F 3/0484 715/709 |
| 2015/0077502 A1* | 3/2015 | Jordan | H04N 7/142 348/14.03 |
| 2015/0082166 A1* | 3/2015 | Sarbin | G06F 3/0488 715/708 |

FOREIGN PATENT DOCUMENTS

| | | | | |
|---|---|---|---|---|
| JP | 8-44253 | 2/1996 | | |
| JP | 2001-47708 | 2/2001 | | |
| JP | 2002-133392 | 5/2002 | | |
| JP | 2003-5880 | 1/2003 | | |
| JP | 2003-44193 | 2/2003 | | |
| JP | 2005-115773 | 4/2005 | | |
| JP | 2005-227853 | 8/2005 | | |
| JP | 2007-25460 | 2/2007 | | |
| JP | 2007-102426 | 4/2007 | | |
| JP | 2007-245587 | 9/2007 | | |
| JP | 2008-21251 | 1/2008 | | |
| JP | 2008-80497 | 4/2008 | | |
| JP | 2009-188833 | 8/2009 | | |
| JP | 5386396 B2 * | 1/2014 | | H04N 1/00 |
| WO | WO 2009121880 A1 * | 10/2009 | | G06F 9/4446 |

OTHER PUBLICATIONS

Bing search q=create%20wizard%20menu%20table&qs= Dec. 4, 2014.*

Bing search q=setup%20wizard%20menu%20table&qs=n Dec. 4, 2015.*

Bing search q=wizard%20list%20menu%20input&qs=n& Sep. 20, 2015.*

Bing search q=wizard+list+menu+format&src=IE-Sea Sep. 20, 2015.*

* cited by examiner

| COPY | | 10 SETS |
|---|---|---|
| SHEET SELECTION | MAGNIFICATION | DENSITY |
| A4 CASSETTE 1 | AUTO | AUTO |
| DIVISION ON BOTH SIDES | AGGREGATE | DOCUMENT IMAGE QUALITY |
| NOT SET | NOT SET | PRINT SCREEN |
| LIST OF FUNCTIONS | OK | |

4100

4105B

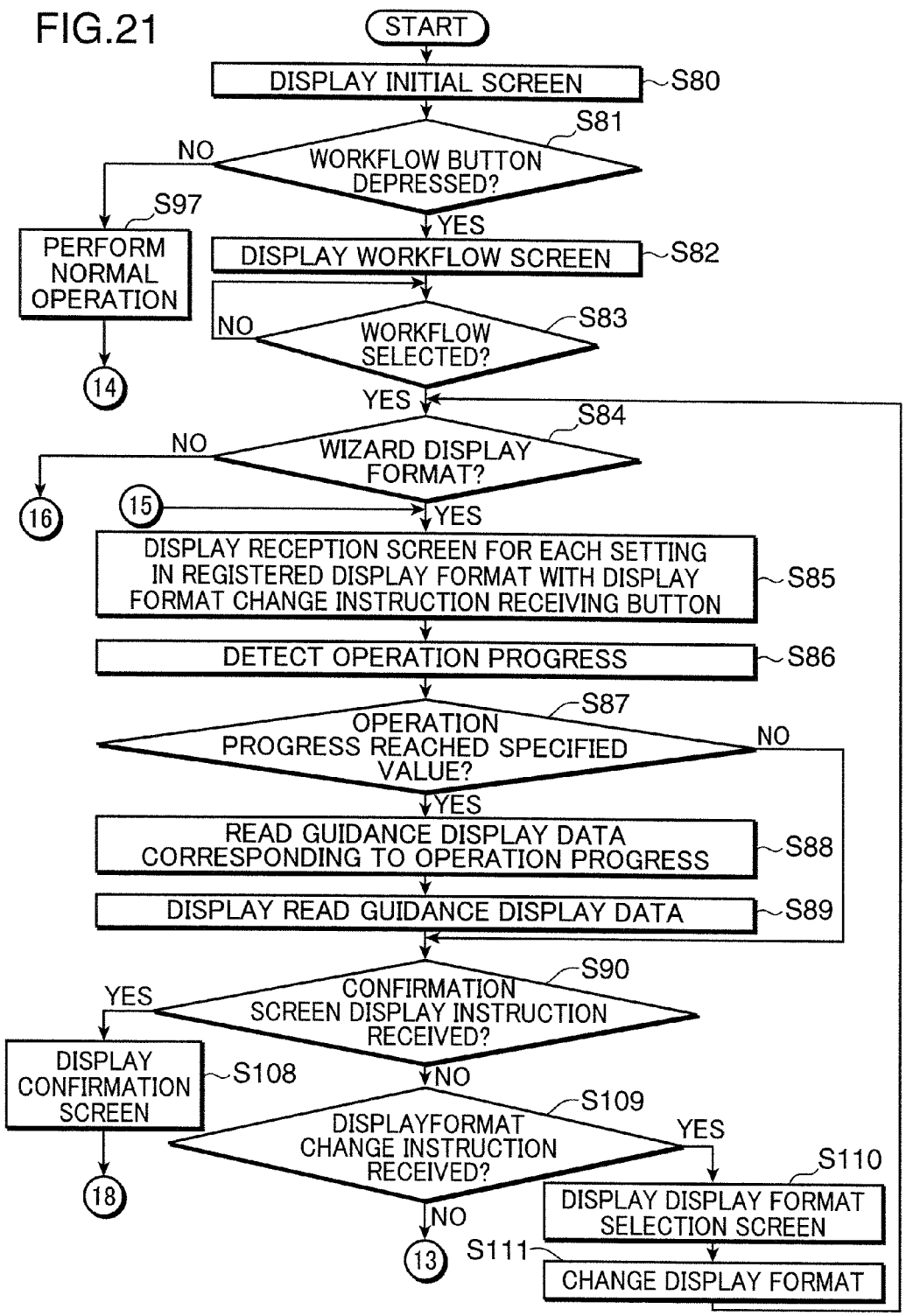

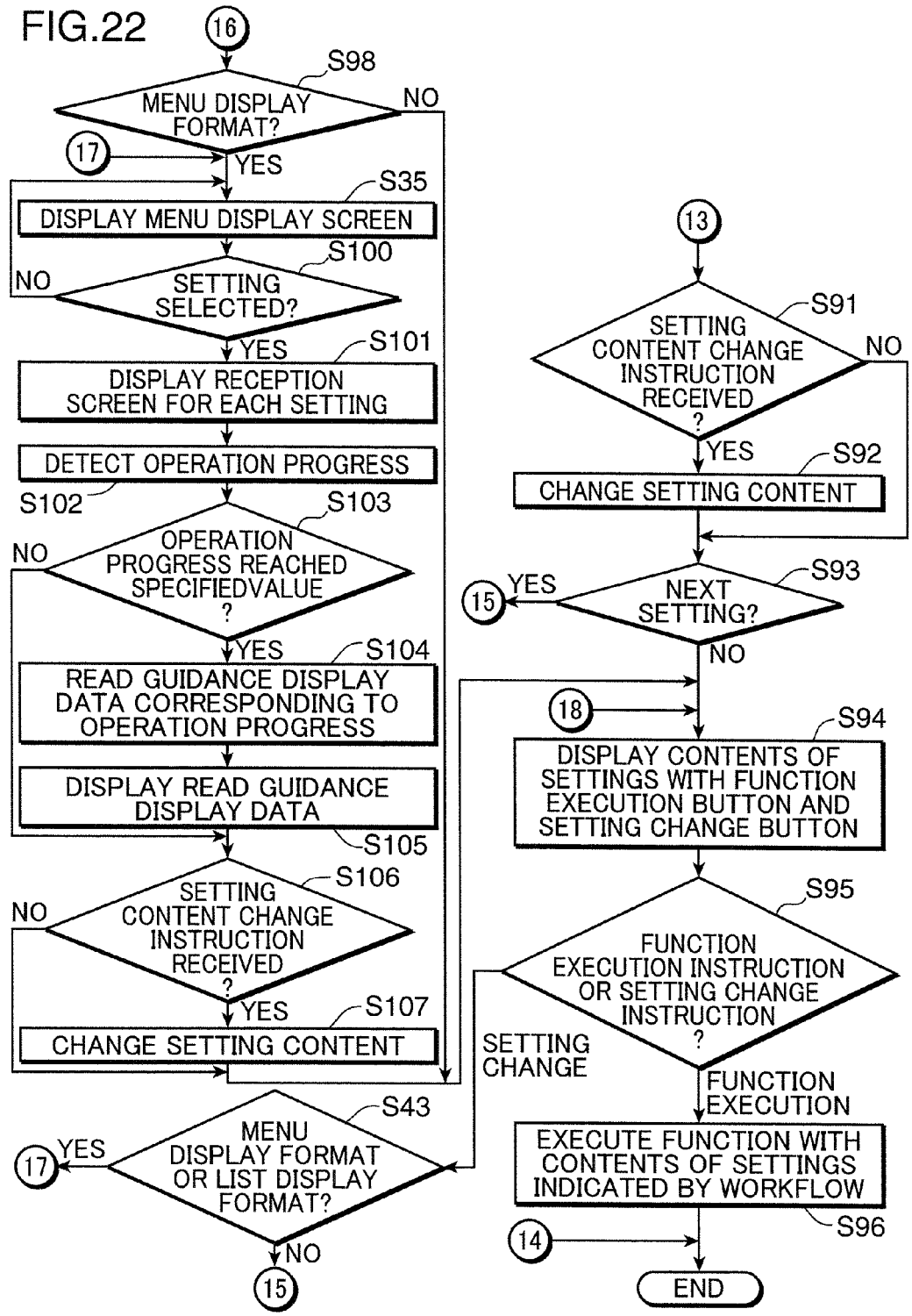

OPERATING DEVICE AND IMAGE
FORMING APPARATUS WITH DISPLAY
FORMAT RECEIVER FOR RECEIVING
INSTRUCTIONS FROM A USER FOR
SELECTING A DISPLAY FORMAT

BACKGROUND OF THE INVENTION

1. Field of the Invention

The present invention relates to an operating device and an image forming apparatus and particularly to a technology for storing settings on functions executable in an electrical apparatus in the electrical apparatus.

2. Description of the Related Art

Conventionally, some of electrical apparatuses such as image forming apparatuses have been known to display function setting screens in a wizard format (user interactive format) on a display section to improve operability at the time of executing a function by a user such as when sheet size, magnification, density, aggregate print or document image quality applied during a copying operation is set. According to this, the user can register contents of settings used for the copying operation in an image forming apparatus by a simpler operation than before in accordance with guidance by respective screens successively displayed on the display section.

SUMMARY OF THE INVENTION

The present invention is a further improvement of the conventional technology described above.

Specifically, the present invention is directed to an operating device, comprising a display controller for causing a display section of an electrical apparatus to display reception screens for respective settings on functions executable in the electrical apparatus; an instruction receiver for receiving an instruction to designate a content of each setting from the user during the display of the reception screen for each setting by the display controller; a display format receiver for receiving a display format selection instruction from the user to select a user's desired display format from at least two of a wizard display format for successively interactively displaying the contents of the respective settings received by the instruction receiver, a list display format for displaying a list of the contents of the respective settings received by the instruction receiver and a menu display format for displaying images indicating contents of the respective settings received by the instruction receiver on one screen; and a storage for storing the display format received by the display format receiver while relating it to the contents of the respective settings received by the instruction receiver.

BRIEF DESCRIPTION OF THE DRAWINGS

FIGS. 21 and 22 are a flow chart showing a process at the time of workflow calling in the multi function peripheral.

DETAILED DESCRIPTION OF THE PREFERRED
EMBODIMENTS

Figure 1:
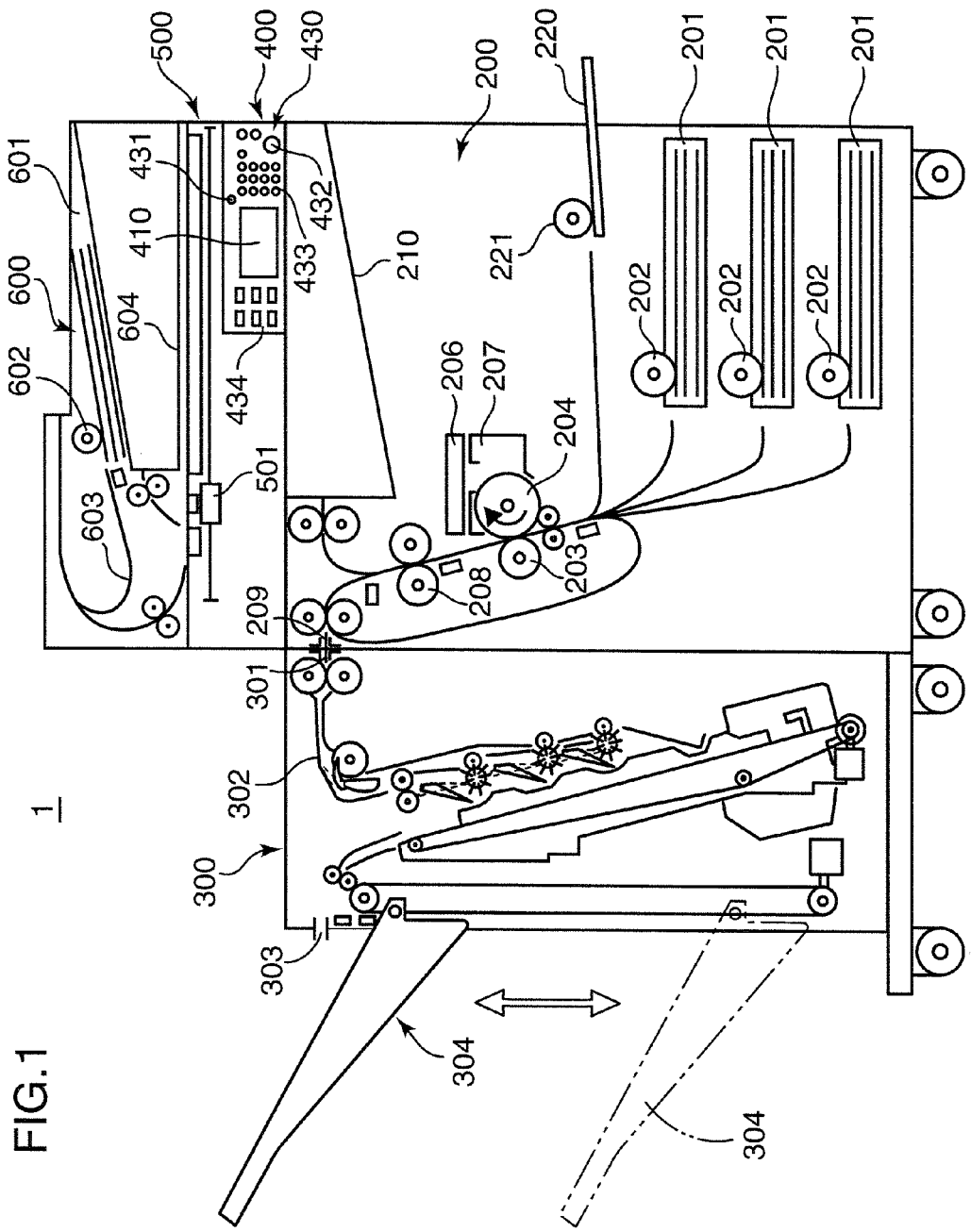
FIG. 1 is a schematic side view showing the construction of a multi function peripheral as an example of an image forming apparatus according to one embodiment of the invention.
Figure 2:
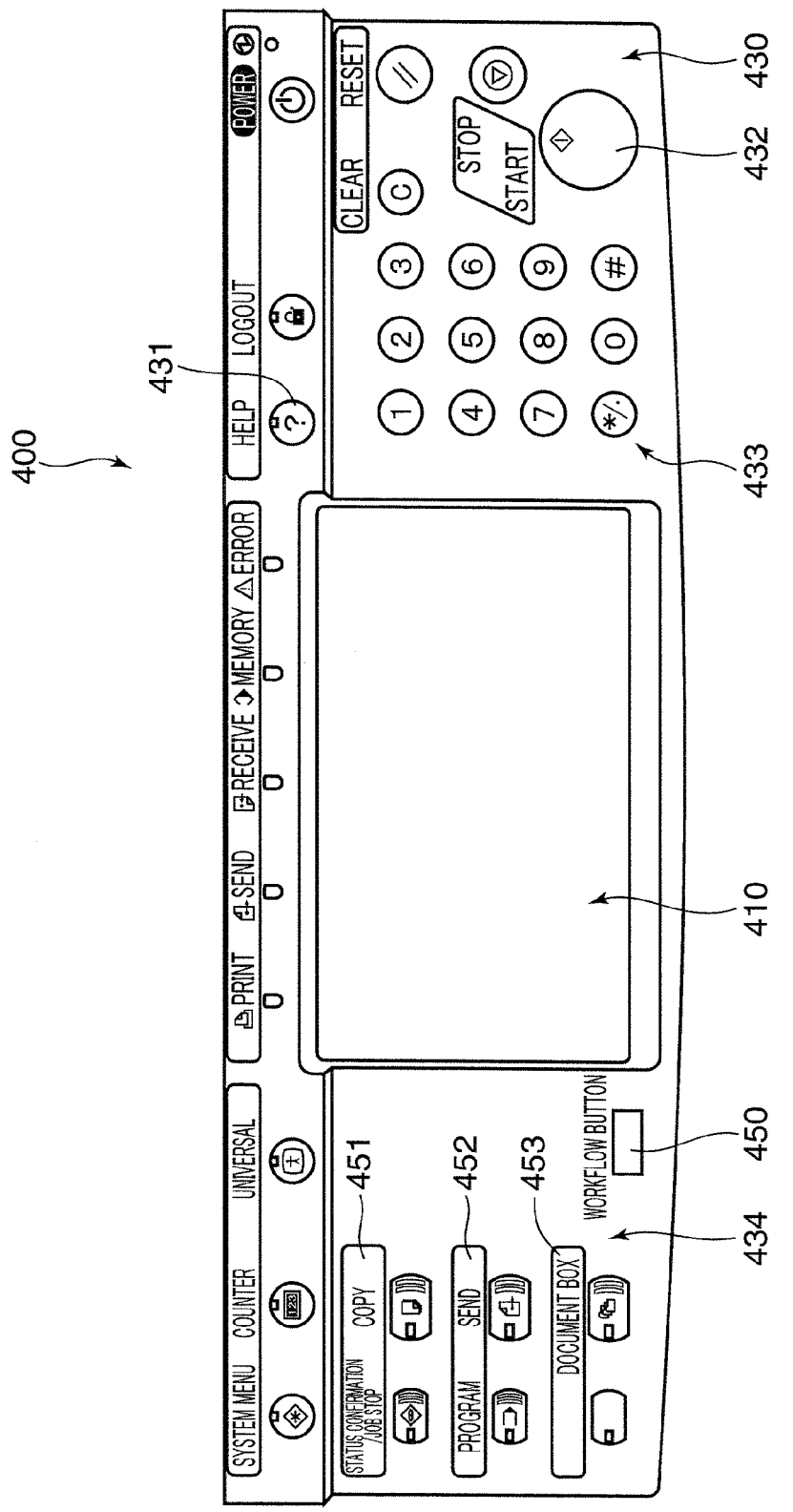
FIG. 2 is a partial enlarged view of an operating unit.

Hereinafter, an operating device and an image forming apparatus including this according to one embodiment of the present invention are described. FIG. 1 is a schematic side view showing the construction of a multi function peripheral as an example of the image forming apparatus according to the embodiment of the present invention. FIG. 2 is a partial enlarged view of an operating unit 400. The multi function peripheral 1 has a scanner function, a facsimile function, a printer function, a copy function and the like. The multi function peripheral 1 is provided with a main unit 200, a sheet post-processing unit 300 arranged at a sheet discharge side of the main unit 200, e.g. at a left side, the operating unit 400 used to enter various operation commands and the like by an operator, a document reading unit 500 arranged atop the main unit 200 and a document feeding unit 600 arranged above the document reading unit 500.

As also shown in FIG. 2, the operating unit 400 includes a display section 410 such as an LCD (Liquid Crystal Display), and an operation key section 430 by means of which operation commands are entered by the operator. The operation key section 430 includes a help key 431, a start key 432, a numerical pad 433 and function switching keys 434.

The help key 431 receives instructions from the operator to cause the display section 410 to display operation guide screens (help screens) for displaying respective operation methods on the scanner function, the facsimile function, the printer function, the copy function and the like.

The start key 432 receives instructions from the operator to start respective operations such as a copying operation and a scanning operation. The numerical pad 433 is composed of keys for receiving an instruction to designate the number of copies to be made, i.e. a copy number, and other instructions from the operator. The function switching keys 434 receive function switching instructions to switch the copy function, a send function (scanner function, facsimile function, etc.) and a box function (function of reading and printing data stored in a storage area (mail box) of each operator provided in a HDD 74 to be described later) from one to another.

The display section 410 includes a touch panel unit which is a combination of an LCD (Liquid Crystal Display) and the like with a touch panel. The display section 410 can display various operation screens and enable the entry of commands to execute various functions by the operator touching the display screen (displayed operation keys).

A workflow button 450 is a button for receiving the entry of an instruction from a user to start a process for a workflow operation for executing a function such as a copying operation or a scanning operation with contents set beforehand by the user or an operation of registering, changing or deleting the workflow operation.

A copy button 451 is a button for receiving an instruction from the user to start the copy function. A send button 452 is a button for receiving an instruction from the user to start an e-mail sending function for reading a document data by a scanner and sending it to a designated e-mail address by e-mail. A document box button 453 is a button for receiving an instruction from the user to start a document box function for reading a document data by the scanner and storing it in a designated destination (folder provided in the HDD 74 of the multi function peripheral 1, etc.). When any one of the copy button 451, the send button 452 and the document box button 453 is depressed by the user, an initial display screen of the function corresponding to the depressed button is displayed on the display section 410 to start a process of the selected function.

The document feeding unit 600 includes a document placing portion 601, a feed roller 602, a document conveying device 603 and a document discharging portion 604, and the document reading unit 500 includes a scanner 501. The feed roller 602 dispenses a necessary number of documents set on the document placing portion 601 one by one, and the document conveying device 603 successively conveys the dispensed documents to a reading position of the scanner 501. The scanner 501 successively read images of the documents being conveyed, and the documents having the images thereof read are discharged to the document discharging portion 604.

The main unit 200 includes a plurality of sheet cassettes 201, a plurality of feed rollers 202, a transfer roller 203, a photoconductive drum 204, an exposure device 206, a developing device 207, a fixing roller 208, a discharge port 209 and a discharge tray 210.

The photoconductive drum 204 is uniformly charged by a charger (not shown) while being rotated in an arrow direction. The exposure device 206 scans a laser beam, which is modulated based on a document image read in the document reading unit 500, on the photoconductive drum 204 to form an electrostatic latent image on a drum surface. The developing device 207 forms a toner image by supplying a black developer to the photoconductive drum 204.

On the other hand, the feed roller 202 dispenses a print sheet from the sheet cassette 201 storing print sheets and feeds it to the transfer roller 203. The transfer roller 203 transfers the toner image on the photoconductive drum 204 to the conveyed print sheet, and the fixing roller 208 fixes the transferred toner image to the print sheet by heating. Thereafter, the print sheet is carried into the sheet post-processing unit 300 through the discharge port 209 of the main unit 200. Further, print sheets are also discharged to the discharge tray 210 according to needs.

The sheet post-processing unit 300 includes a carry-in port 301, a print sheet conveying device 302, a carry-out port 303 and a stack tray 304. The print sheet conveying device 302 successively conveys print sheets carried in through the carry-in port 301 from the discharge port 209 and finally discharges them to the stack tray 304 through the carry-out port 303. The stack tray 304 is formed to be vertically movable in arrow directions according to the number of stacked print sheets carried out through the carry-out port 303.

Figure 3:
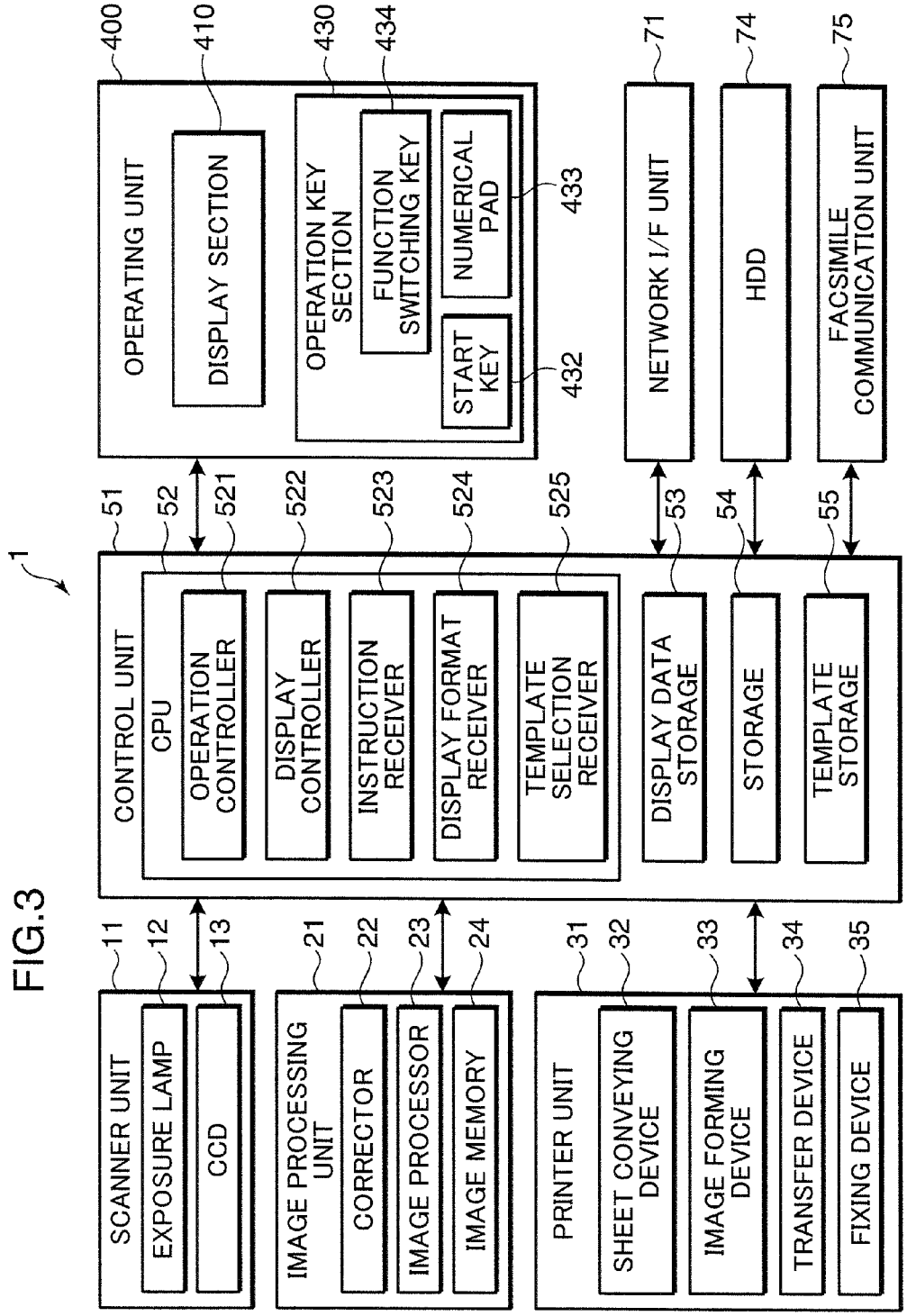
FIG. 3 is a control block diagram of the multi function peripheral shown in FIG. 1.

FIG. 3 is a control block diagram of the multi function peripheral 1 shown in FIG. 1. The multi function peripheral 1 includes a scanner unit 11, an image processing unit 21, a printer unit 31, the operating unit 400, a control unit 51, a network I/F (interface) unit 71, the HDD (Hard Disk Drive) 74 and a facsimile communication unit 75.

The scanner unit 11 includes an exposure lamp 12 and a CCD (charge-coupled device) constituting the scanner 501 shown in FIG. 1. The scanner unit 11 reads an image from a document by irradiating the document by the exposure lamp 12 and receiving the reflected light by the CCD 13 and outputs an image corresponding to the read image to the image processing unit 21.

The image processing unit 21 includes a corrector 22, an image processor 23 and an image memory 24. The image processing unit 21 processes the read image using the corrector 22 and the image processor 23 according to need. The image processed by the image processing unit 21 is stored in the image memory 24 to be printed or output to the printer unit 31. The corrector 22 performs a specified correction process such as a level correction and a γ-correction on the read image. The image processor 23 performs various processings such as image compression/expansion and size enlargement/reduction on the image.

The printer unit 31 includes a sheet conveying device 32 composed of the sheet cassette 201, the feed roller 202 and the like, an image forming device 33 composed of the photoconductive drum 204, the exposure device 206, the developing device 207 and the like shown in FIG. 1, a transfer device 34 composed of the transfer roller 203 and the like shown in FIG. 1, and a fixing device 35 composed of the fixing roller 208 and the like shown in FIG. 1. The printer unit 31 prints an image on a recording sheet using a document data read by the scanner unit 11. Specifically, the sheet conveying device 32 conveys the recording sheet to the image forming device 33, the image forming device 33 forms a toner image corresponding to this image, the transfer device 34 transfers the toner image to the recording sheet and the fixing device 35 fixes the toner image to the recording sheet to form an image.

The network I/F unit 71 controls transmission and reception of various data to and from external apparatuses via a LAN using a network interface (10/100 Base-TX) or the like. The HDD 74 stores images read by the scanner unit 11 and output formats set for these images.

The operating unit 400 includes the display section 410 and the operation key section 430 as shown in FIGS. 1 and 2. The display section 410 displays a plurality of keys for receiving the entry of various instructions by its touch panel function under the control of a display controller 522. The function switching keys 434, the start key 432, the numerical pad 433 and the like shown in FIG. 2 are provided in the operation key section 430. A CPU 52 of the control unit 51 receives instructions entered by the operator by way of the respective keys of the display section 410 and the operating unit 400.

The facsimile communication unit 75 includes an encoder/decoder (not shown), a modem (not shown) and an NCU (Network Control Unit) (not shown). The facsimile communication unit 75 transmits an image data of a document read by the scanner unit 11 to a facsimile machine or the like via a telephone line and receives an image data transmitted from the facsimile machine or the like. The encoder/decoder compresses/encodes an image data to be transmitted and expands/decodes a received image data. The modem modulates the compressed/encoded image data into an audio signal, and demodulates a received signal (audio signal) into an image data. The NCU controls connection with the facsimile machine or the like as a communication destination by the telephone line.

The control unit 51 includes the CPU 52, a display data storage 53, a storage 54 and a template storage 55.

The CPU 52 controls the operation of the multi function peripheral 1. The display data storage 53 stores various data used to display operation guidance for the operator (in this embodiment, the display data storage 53 particularly stores display data used to cause the display section 410 to display reception screens for receiving respective settings needed to be registered to execute the functions such as the copying operation and the scanning operation), and image data (including respective data of images, characters, symbols, etc.) used to display operating statuses of the respective functions such as the scanner function, the facsimile function, the printer function and the copy function.

The storage 54 stores a display format received from the user by a display format receiver 524 to be described later and a template received by a template selection receiver 525 to be described later while relating them to contents of the respective setting needed to be registered to execute the functions such as the copying operation and the scanning operation and received from the user by an instruction receiver 523 to be described later.

The template storage 55 stores a plurality of templates (fixed forms) as combinations of the respective settings on the functions executable in the electrical apparatus. Each template, for example, includes setting items such as copy number, sheet size, magnification, density, aggregate print, document image quality and division on both sides applied in each function for each function such as the copying operation. The template is used in a workflow for a process for guiding the user to perform the respective settings needed to be registered for the execution of the function such as the copying operation or a workflow for storing contents of the respective settings applied upon executing the function such as the copying operation and executing the function such as the copying operation with the respective setting contents.

The CPU 52 includes an operation controller 521, the display controller 522, the instruction receiver 523, the display format receiver 524 and the template selection receiver 525.

The operation controller 521 controls the operations of the respective units (scanner unit 11, image processing unit 21, printer unit 31, etc.) of the multi function peripheral 1.

The display controller 522 controls a display operation of the display section 410. The display controller 522 causes the display section 410 to display reception screens for receiving, for example, respective settings needed to be registered for the execution of the functions such as the copying operation and the scanning operation from the user.

The instruction receiver 523 receives an instruction for designating the content of each setting from the user, for example, by the touch panel function of the display section 410 when the reception screen for each setting is displayed by the display controller 522. The instruction receiver 523 also receives an instruction to delete the contents of the respective setting stored in the storage 54 and the template and the display format related to the settings and other instructions from the user when a deletion instruction reception screen is displayed on the display section 410. Further, the instruction receiver 523 receives a display format change instruction to change the wizard display format, the list display format or the menu display format used for the display on the display section 410 to another display format from the user.

The display format receiver 524 receives from the user, for example, by the above touch panel function, a display format selection instruction to select a user's desired display format from the wizard display format for successively interactively displaying the contents of the respective settings received by the display format receiver 524 on different screens, the list display format for displaying a list of the contents of the respective settings received by the instruction receiver 523 on one screen and a menu display format for displaying the contents of the respective settings received by the instruction receiver 523 on one screen using corresponding images. The display format receiver 524 is not limited to the one that receives all of the wizard display format, the list display format and the menu display format as selectable items, and may receive selection of the user's desired display format out of at least two out of the wizard display format, the list display format and the menu display format.

The template selection receiver 525 receives selection of a desired template from those stored in the template storage 55 from the user, for example, by the touch panel function.

Figure 4:
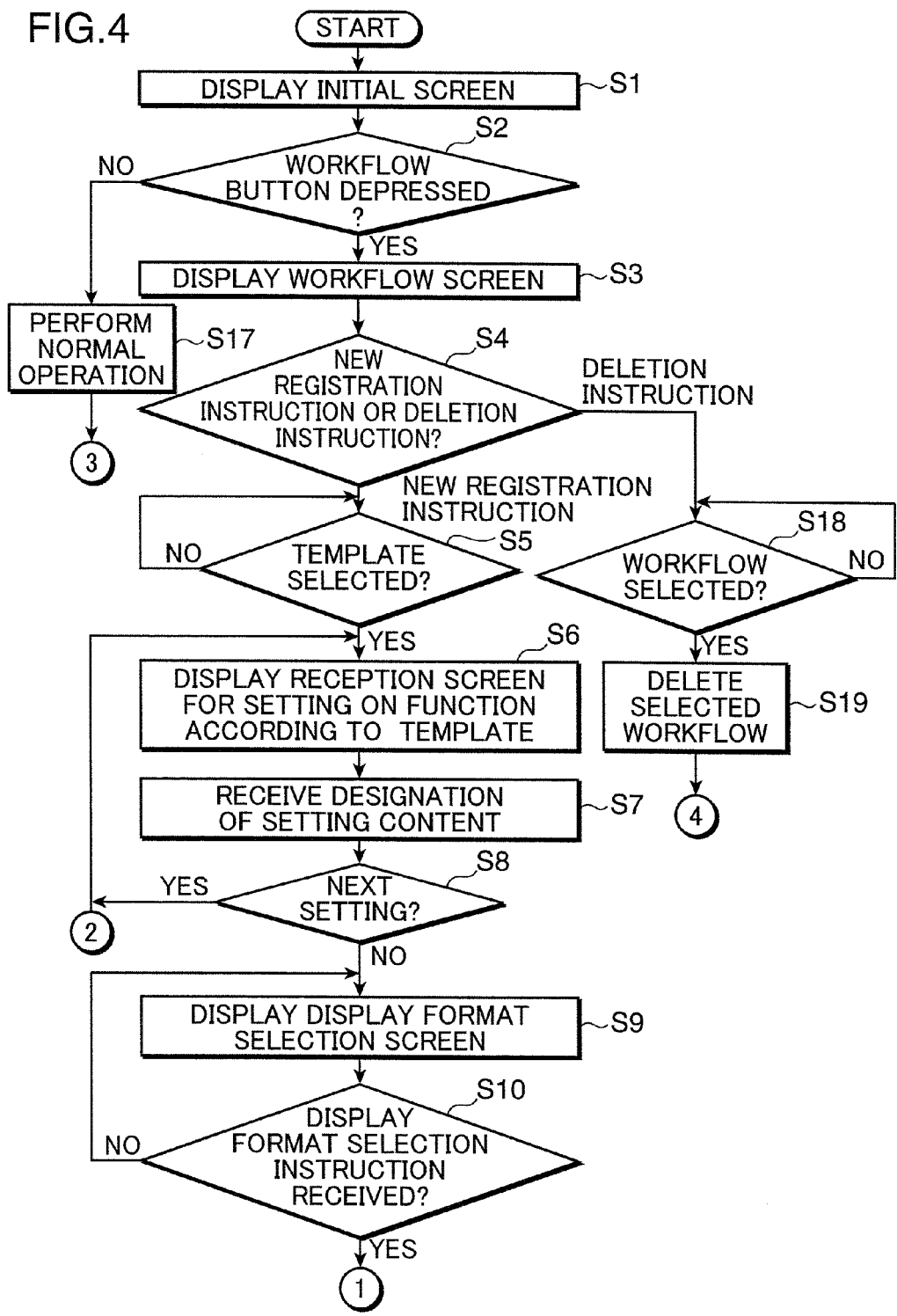
FIGS. 4 and 5 are a flow chart showing a process at the time of workflow generation and registration in the multi function peripheral.
Figure 5:
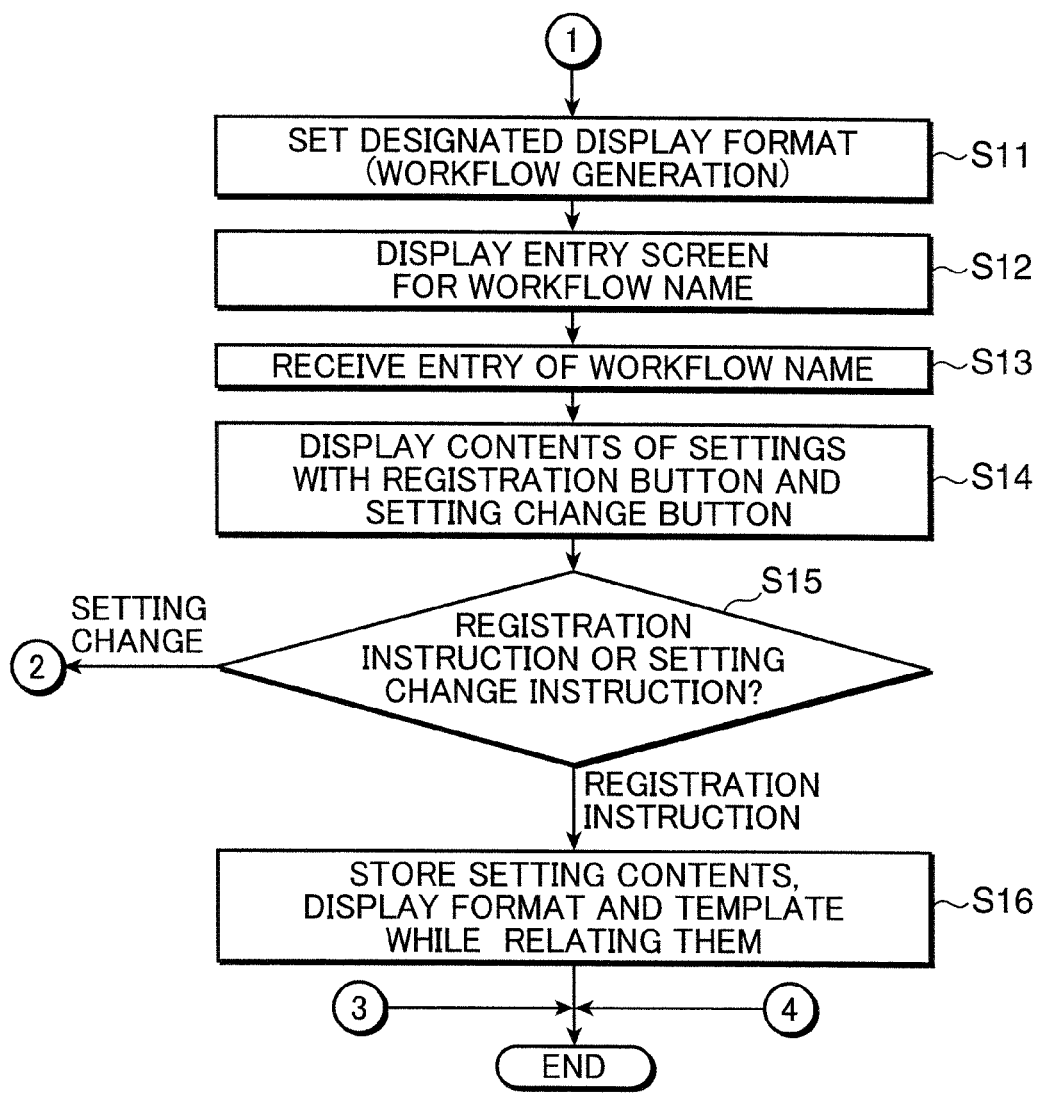
Figure 6:
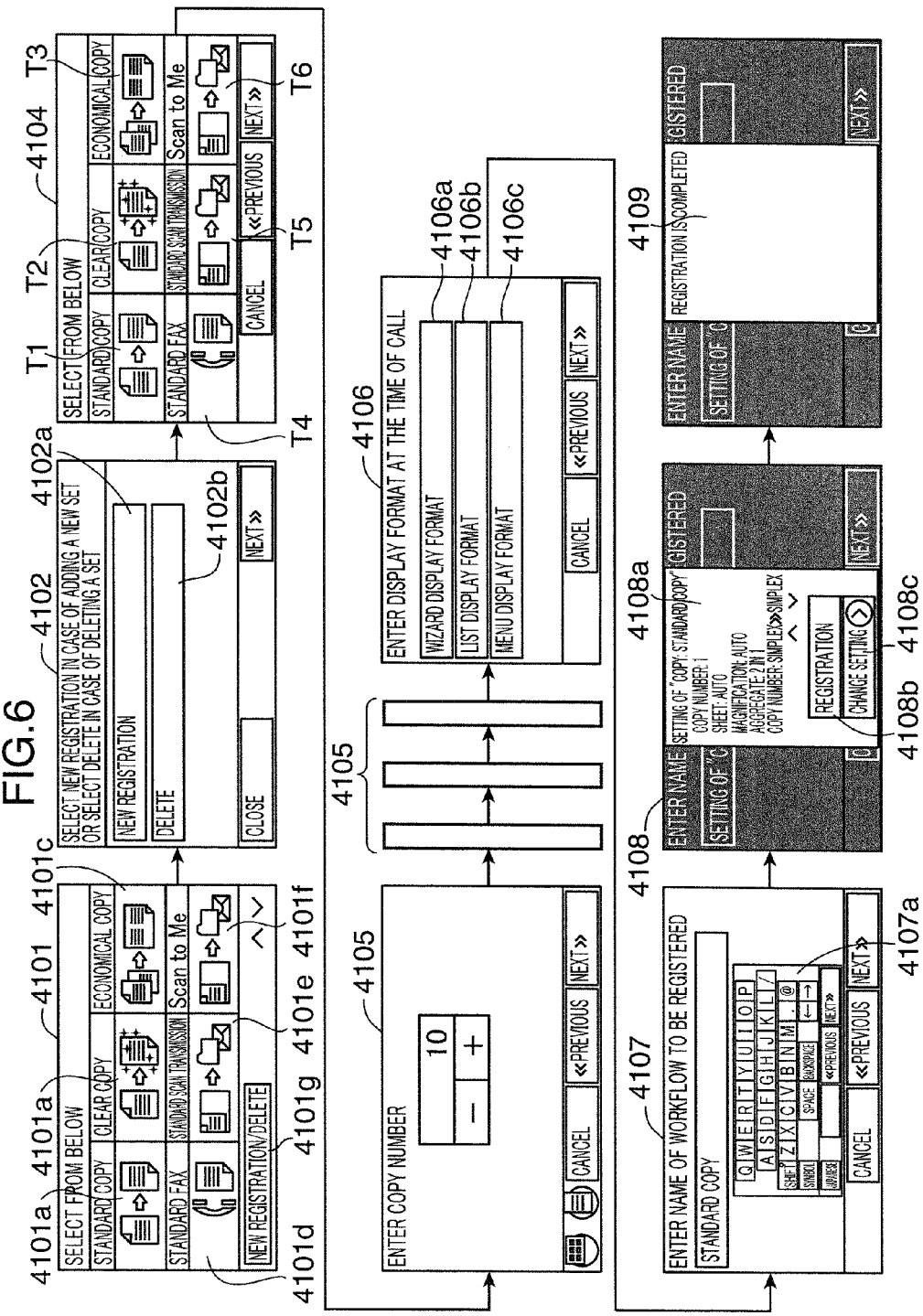
FIG. 6 is a diagram showing transitions of display screens on a display section at the time of workflow generation and registration for a copy function.
Figure 7:
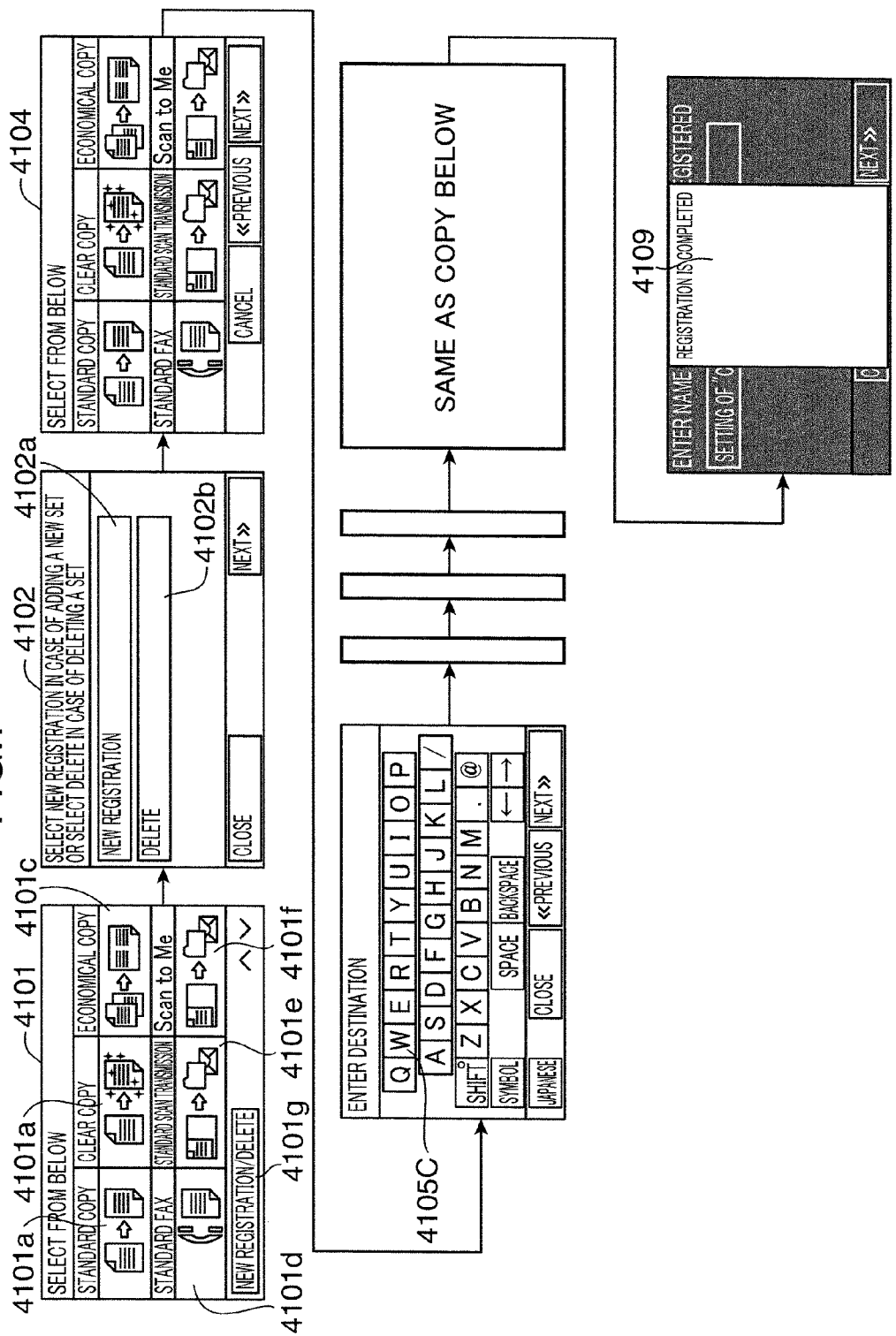
FIG. 7 is a diagram showing transitions of display screens on the display section at the time of workflow generation and registration for a scan function.
Figures 8, 9:
FIG. 8 is a diagram showing an exemplary display screen on the display section.
FIG. 9 is a diagram showing another exemplary display screen on the display section.
Figure 10:
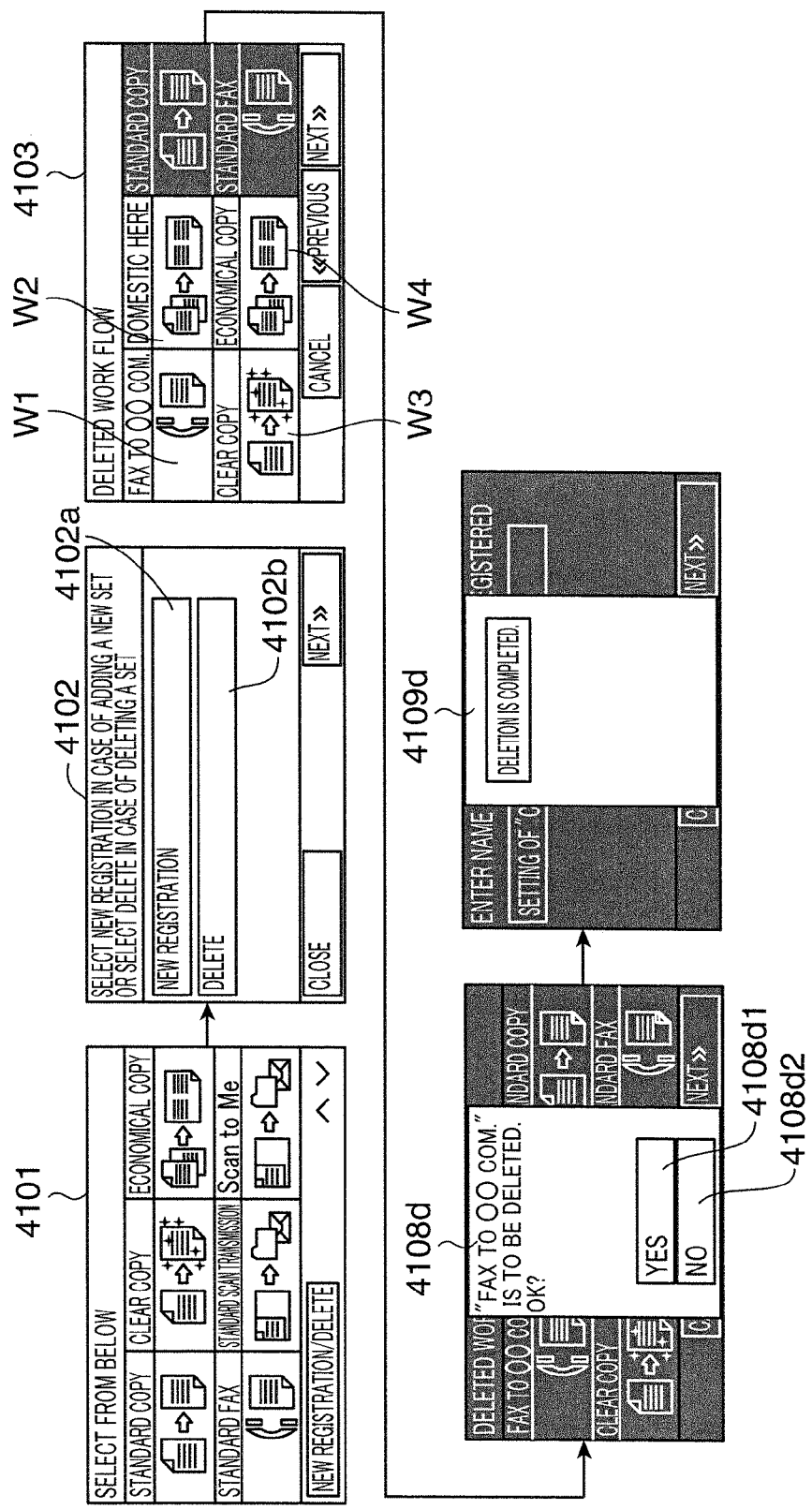
FIG. 10 is a diagram showing transitions of display screens on the display section at the time of workflow deletion.

Next, a process at the time of workflow generation and registration in the multi function peripheral 1 is described. FIGS. 4 and 5 are a flow chart showing the process at the time of workflow generation and registration in the multi function peripheral 1. FIG. 6 is a diagram showing transitions of display screens of the display section 410 at the time of workflow generation and registration for the copy function. FIG. 7 is a diagram showing transitions of display screens of the display section 410 at the time of workflow generation and registration for the scanner function. FIGS. 8 and 9 are diagrams showing exemplary display screens of the display section 410. FIG. 10 is a diagram showing transitions of display screens of the display section 410 at the time of workflow deletion.

When a main power supply of the multi function peripheral 1 is turned on by the user and, for example, the copy function is started by depressing the copy button 451, the display controller 522 causes the display section 410 to display, for example, an initial screen 4100 shown in FIG. 8 (S1).

When the workflow button 450 of the operating unit 400 is depressed by the user during the display of this initial screen 4100 and a workflow start instruction is received by the instruction receiver 523 (YES in S2), the display controller 522 causes a workflow screen 4101 (FIG. 6) to be displayed (S3). In this way, a process for generating and registering or deleting the workflow is started. The display controller 522 causes a new registration/deletion button 4101g for receiving new registration and deletion of a workflow from the user to be displayed on the workflow screen 4101.

If the workflow button 450 is not depressed by the user (workflow start instruction is not received) and, instead, an instruction to perform the copying operation is entered by depressing the start key 432, the numerical pad 433 and the like with setting contents such as sheet selection and magnification designated by the user on the initial screen 4100 or with preset contents while the initial screen 4100 is displayed (NO in S2), the copying operation is performed as usual as the above depressing operation is performed (S17).

When the new registration/deletion button 4101g is pressed by the user during the display of the workflow screen 4101 by the display controller 522, the display controller 522 causes the display section 410 to display a workflow registration/deletion screen 4102 (FIG. 6) for prompting the user to select whether to newly register or to delete a workflow. Upon switching the display from the workflow screen 4101 to the workflow registration/deletion screens 4102, the display controller 522 switches the display of the display section 410, for example, such that the workflow registration/deletion screens 4102 gradually slides downward from an upper part of a display area of the display section 410 or upward from a lower part of the display area of the display section 410 to appear in the display area of the display section 410 and finally the workflow registration/deletion screens 4102 is entirely displayed. The display controller 522 causes a new registration button 4102a for receiving a workflow new registration instruction from the user and a deletion button 4102b for receiving a workflow deletion instruction from the user to be displayed on the workflow registration/deletion screens 4102.

Here, when the delete button 4102b is pressed by the user and the workflow deletion instruction is received by the instruction receiver 523 by the touch panel function ("DELETION INSTRUCTION" in S4), the display controller 522 causes the display section 410 to display a deletion target selection screen 4103 for prompting selection of the workflow to be deleted (FIG. 10). As shown in FIG. 10, images W1, W2, . . . showing the respective workflows as deletion targets are displayed on this deletion target selection screen 4103. Upon switching the display from the workflow registration/deletion screens 4102 to the deletion target selection screen 4103, the display controller 522 switches the display of the display section 410, for example, such that the deletion target selection screen 4103 gradually slides rightward from a left part of the display area of the display section 410 or leftward from a right part of the display area of the display section 410 to appear in the display area of the display section 410 and finally the deletion target selection screen 4103 is entirely displayed.

The storage 54 stores information indicating the workflows whose deletion is permitted (e.g. workflows customized by the user) and workflows whose deletion is not permitted (e.g. workflows installed by default). The display controller 522 allows the user to recognize the workflows whose deletion is permitted and workflows whose deletion is not permitted by displaying only the workflows whose deletion is permitted as the images W1, W2, . . . , and not displaying the workflows whose deletion is not permitted on the deletion target selection screen 4103, or showing by means of grey out display as shown in FIG. 10.

When any one of the images W1, W2, . . . indicating the workflows whose deletion is permitted is pressed by the user during the display of this deletion target selection screen 4103 and selection of the workflow to be deleted is received by the instruction receiver 523 by the touch panel function (YES in S18), the display controller 522 causes the display section 410 to display a deletion confirmation screen 4108d. Upon switching the display from the deletion target selection screen 4103 to the deletion confirmation screen 4108d, the display controller 522 switches the display of the display section 410, for example, such that the deletion confirmation screen 4108d gradually slides downward from the upper part of the display area of the display section 410 or upward from the lower part of the display area of the display section 410 to appear in the display area of the display section 410 and finally the deletion confirmation screen 4108d is entirely displayed.

A "YES" button 4108d1 for receiving an instruction to the effect of confirming the deletion of the above workflow from the user and a "NO" button 4108d2 for receiving an instruction to the effect of denying the deletion of the above workflow from the user are caused to be displayed on this deletion confirmation screen 4108d by the display controller 522. Here, when the "YES" button 4108d is pressed by the user and the operation controller 521 receives the instruction to the effect of confirming the deletion of the workflow, the operation controller 521 deletes the contents of the respective settings, for example, on the copy function constituting the selected workflow and the template and display format related to this from the storage 54 (S19). Thereafter, the display controller 522 causes the display section 410 to display a deletion notification screen 4109d. Although not particularly shown in FIGS. 4 and 5, this process returns to S3 when the "NO" button 4108d2 is pressed by the user and the operation controller 521 receives the instruction to the effect of denying the deletion of the workflow.

On the other hand, when the new registration button 4102a is depressed during the display of the workflow registration/deletion screen 4102 and the workflow new registration instruction is received by the instruction receiver 523 by the touch panel function ("NEW REGISTRATION INSTRUCTION" in S4), the display controller 522 causes the display section 410 to display a template selection screen 4104 (FIG. 6) for prompting selection of the template used for workflow generation. Images T1 to T6 indicating the respective templates usable for workflow generation are displayed on this template selection screen 4104.

When any one of the images T1 to T6 indicating the templates is pressed by the user during the display of this template selection screen 4104 and selection of the template used for workflow generation is received by the instruction receiver 523 by the touch panel function (YES in S5), the display controller 522 reads the selected template from the storage 54 and causes the display section 410 to successively display reception screens for the respective settings on the function indicated by the read template (e.g. copy number, sheet size, magnification, density, aggregate print, document image quality, division on both sides, etc. in the case of the copy function) in the wizard display format (S6). The display data storage 53 stores display data used to display the reception screens for the respective settings on the display section 410. The display controller 522 commonly uses display data for general reception screens conventionally used at the time of entering the contents of the respective settings (e.g. copy number, sheet size, magnification, density, aggregate print, document image quality, division on both sides, etc. in the case of the copy function) as the reception screens for the respective settings also in the case of guiding the user using the wizard display format. Examples of the reception screens are a copy number reception screen 4105 shown in FIG. 6 and an aggregate reception screen 4105B shown in FIG. 9.

Upon switching the display from the template selection screen 4104 to each reception screen, the display controller 522 switches the display of the display section 410, for example, such that each reception screen gradually slides rightward from the left part of the display area of the display section 410 or leftward from the right part of the display area of the display section 410 to appear in the display area of the display section 410 and finally this reception screen is entirely displayed.

The instruction receiver 523 receives content designation (e.g. specific number of the above copy number) for the setting being guided on the reception screen by the touch panel function based on the operation of the operation buttons displayed on the reception screen by the user during the display of the reception screen for each setting (S7).

The display controller 522 displays the reception screens for all the settings relating to the function indicated by the read template, repeats the display of the reception screens and the reception of the setting contents until the content designation is received on all the reception screens (S8) and causes the display section 410 to display a display format selection screen 4106 (S9) when the display of the reception screens and the reception of the setting contents for all the settings are completed (NO in S8).

A wizard display format button 4106a, a list display format button 4106b and a menu display format button 4106c for prompting the user to select any one of the above wizard display format, list display format and menu display format are caused to be displayed on this display format selection screen 4106 by the display controller 522.

When any one of the wizard display format button 4106a, the list display format button 4106b and the menu display format button 4106c is pressed by the user during the display of this display format selection screen 4106 and an instruction to select any one of the display formats is received by the display format receiver 524 (YES in S10), the operation controller 521 relates the display format received by the display format receiver 524 in S10 and the template received by the template selection receiver 525 in S5 to the contents of the respective settings received by the instruction receiver 523 in S7 (S11). In other words, by this relating, a display for allowing the user to confirm the contents of the respective settings received by the instruction receiver 523 in S7 is shown in the display format received by the display format receiver 524 in S10, for example, upon executing the function such as the copying operation, and a workflow for executing the function such as the copying operation with these contents of the respective settings is generated. The display format received in S10 and S11 is applied at the time of displaying the reception screens for the respective settings in a workflow calling process to be described later.

Subsequently, the display controller 522 causes the display section 410 to display an entry screen 4107 used to enter the name of the generated workflow (S12). A keyboard image 4107a and the like are displayed on this entry screen 4107, and the user can enter the workflow name using the touch panel function by pressing the keyboard image.

When the workflow name is entered by the user through the operation of the entry screen 4107 (S13), the operation controller 521 causes the display section 410 to display a confirmation screen 4108 including an image 4108a displaying a list of contents of the respective settings received by the instruction receiver 523 in S7, a registration button 4108b for receiving an instruction to register the workflow with the listed contents of the respective setting and a setting change button 4108c for receiving an instruction to change the listed contents of the respective settings (S14).

Upon switching the display from the entry screen 4107 to the confirmation screen 4108, the display controller 522 switches the display of the display section 410, for example, such that the list display image 4108a gradually slides downward from the upper part of the display area of the display section 410 or upward from the lower part of the display area of the display section 410 to appear in the display area of the display section 410 and finally the list display image 4108a is entirely displayed.

When the registration button 4108b is pressed by the user during the display of this confirmation screen 4108 and the instruction to register the workflow with the list contents of the respective settings is received by the instruction receiver 523 ("REGISTRATION INSTRUCTION" in S15), the operation controller 521 relates the listed contents of the respective settings to the display format received by the display format receiver 524 and the template received by the template selection receiver 525 in S5, and stores these in the storage 54 (S16). Thereafter, the display controller 522 causes the display section 410 to display a registration end screen 4109 for notifying the user of the end of the registration.

When the setting change button 4108c is pressed by the user during the display of the confirmation screen 4108 and the instruction to change the listed contents of the respective settings is received by the instruction receiver 523 ("SETTING CHANGE INSTRUCTION" in S15), the display controller 522 returns the process to S6, thereby returning to the operation of causing the display section 410 to successively display the respective reception screens for the respective settings (e.g. copy number, sheet size, magnification, density, aggregate print, document image quality, division on both sides, etc. in the case of the copy function) on the function indicated by the template whose selection is received in S5 (S6).

Further, when the user presses a display part of each setting content on the list display image 4108a, the display controller 522 may receive an instruction to change the pressed setting content by the touch panel function and cause the display section 410 to display the reception screen corresponding to the pressed setting content, and the operation controller 521 may individually receive the instruction to change the pressed setting content on this reception screen.

Although the transitions of the display screens at the time of the copy function are described above, reception screens (e.g. reception screen 4105C) corresponding to respective settings indicate setting items corresponding to the scanner function in transitions of display screens, for example, at the time of the scanner function as shown in FIG. 7.

Figure 11:
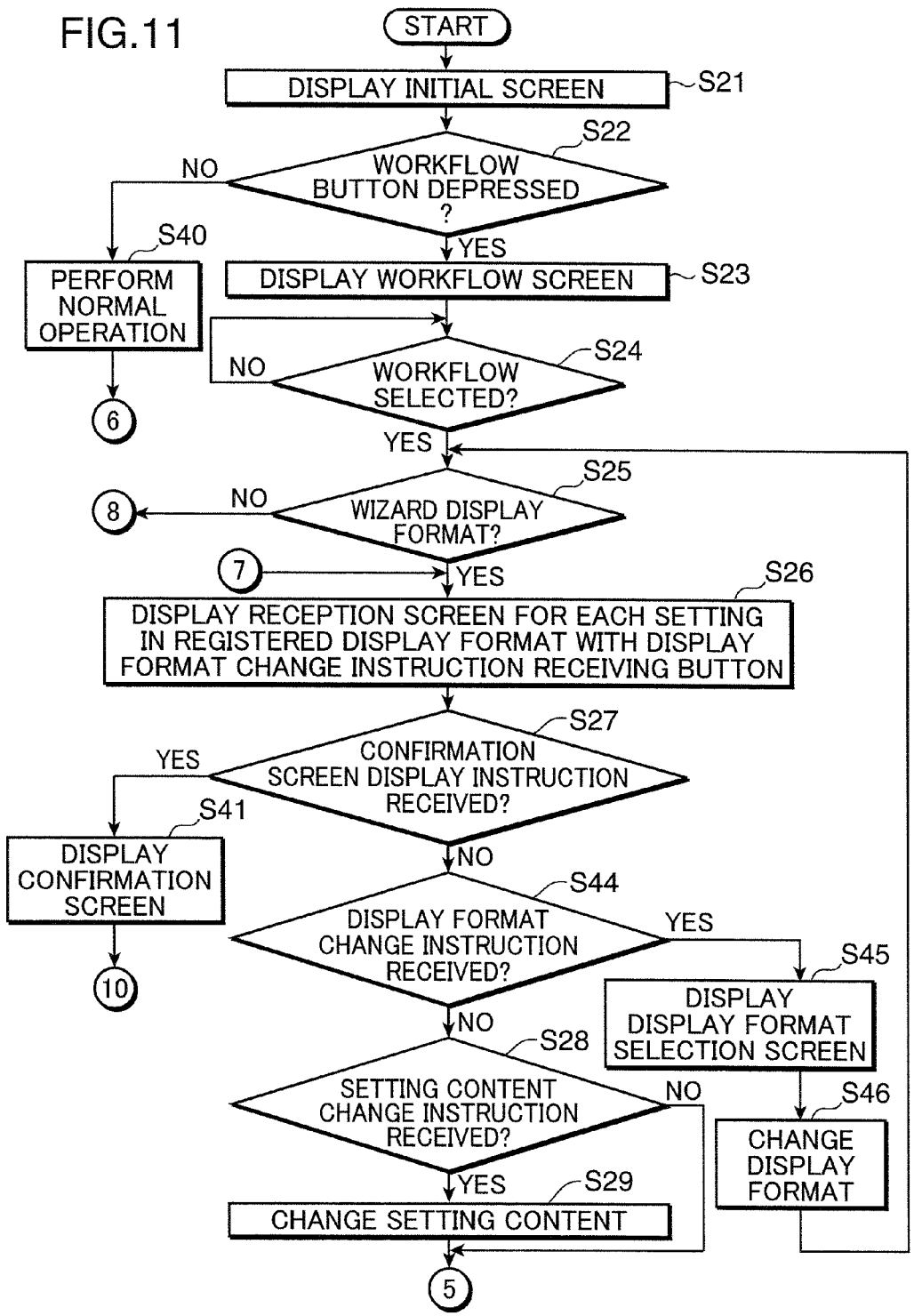
FIGS. 11 and 12 are a flow chart showing a process at the time of workflow calling in the multi function peripheral.
Figure 12:
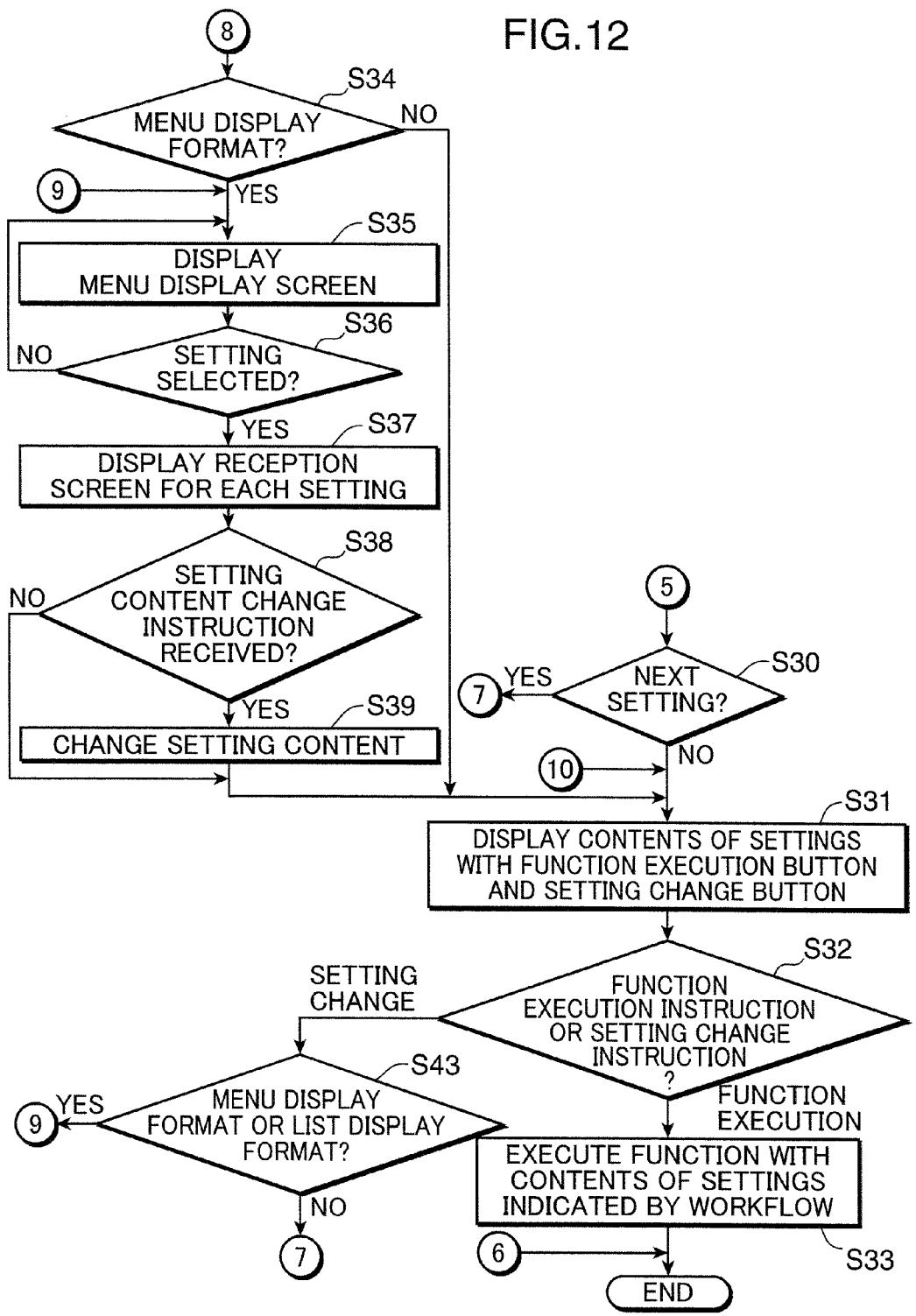
Figure 13:
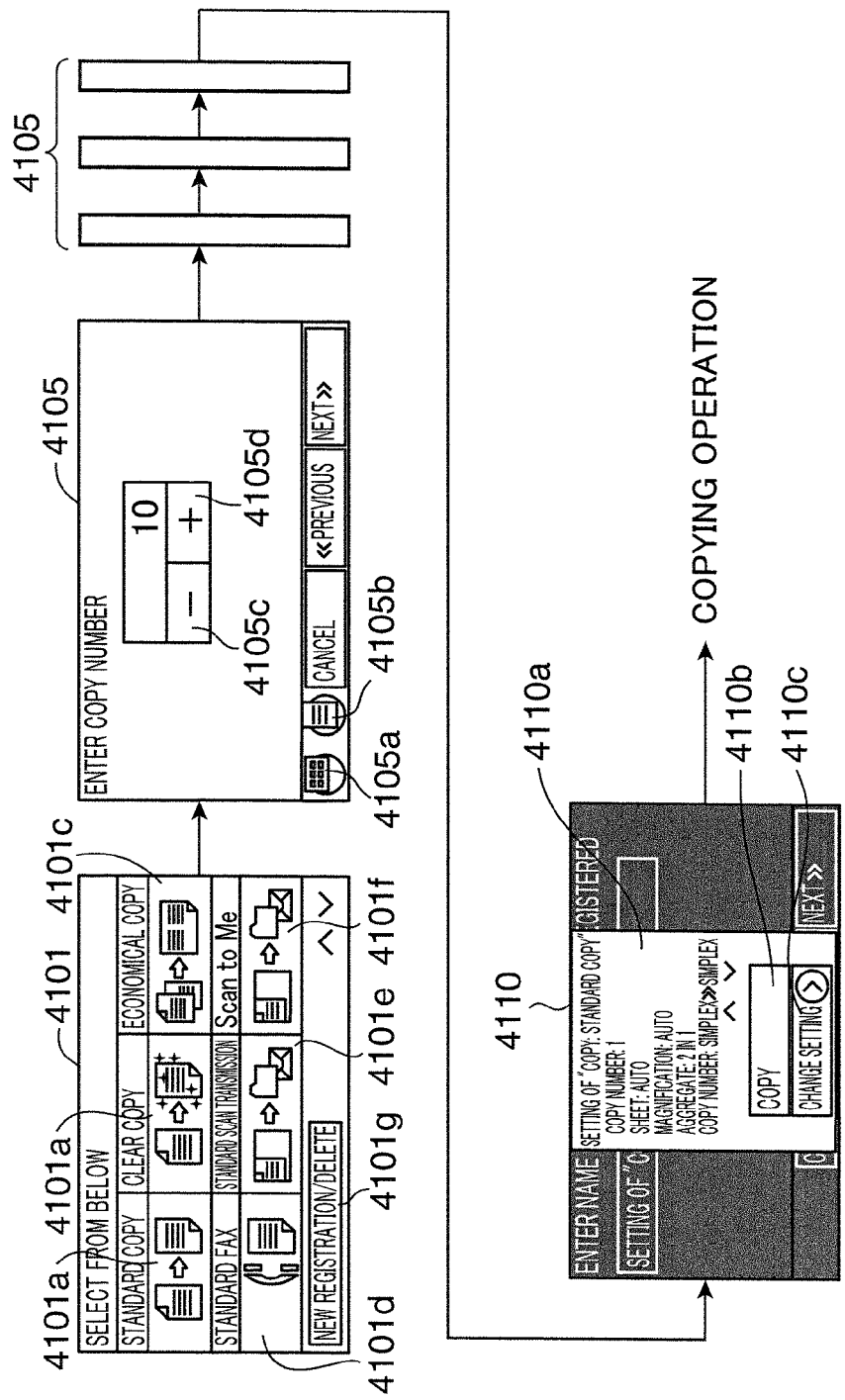
FIG. 13 is a diagram showing transitions of display screens in a wizard display format at the time of workflow calling for the copy function.
Figure 14:
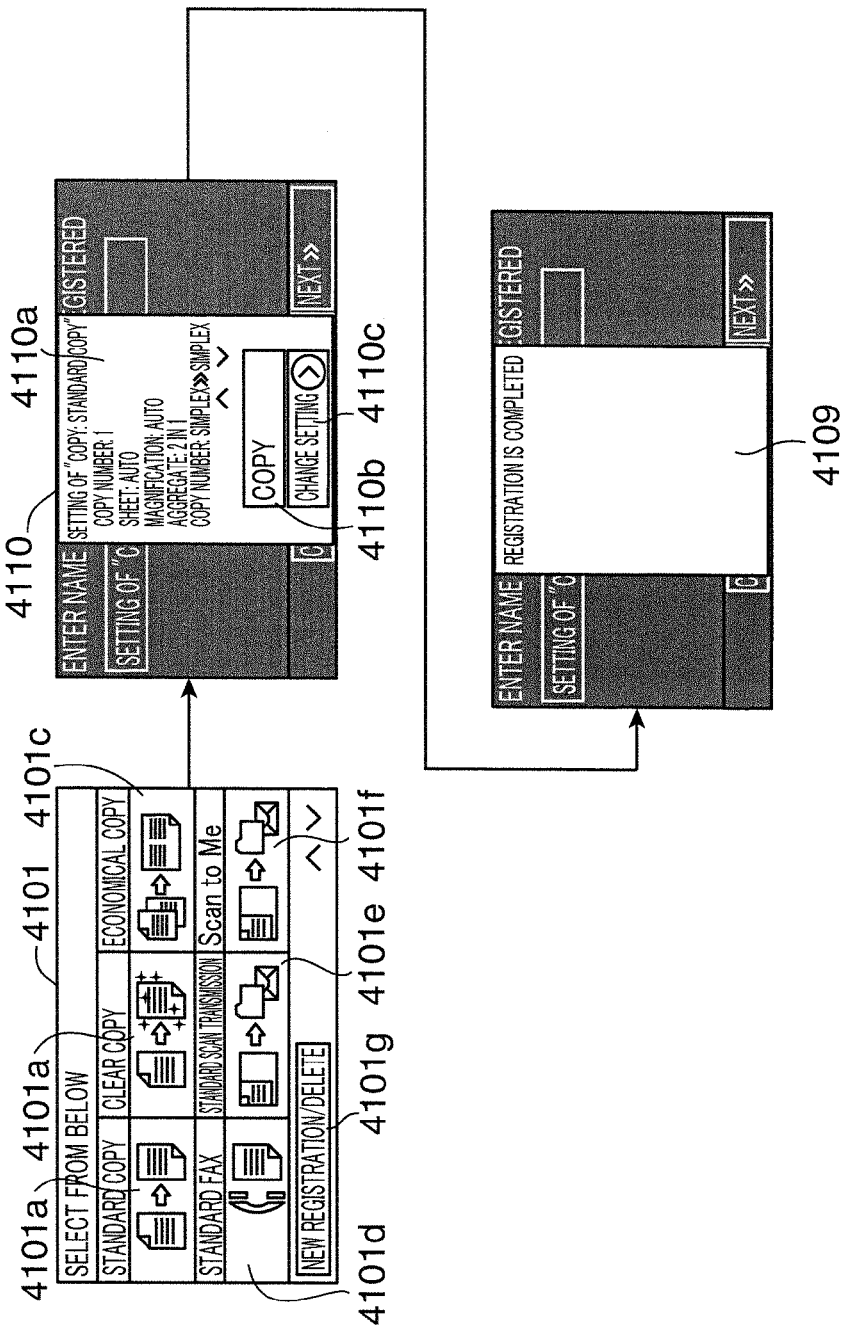
FIG. 14 is a diagram showing transitions of display screens in a list display format at the time of workflow calling for the copy function.
Figure 15:
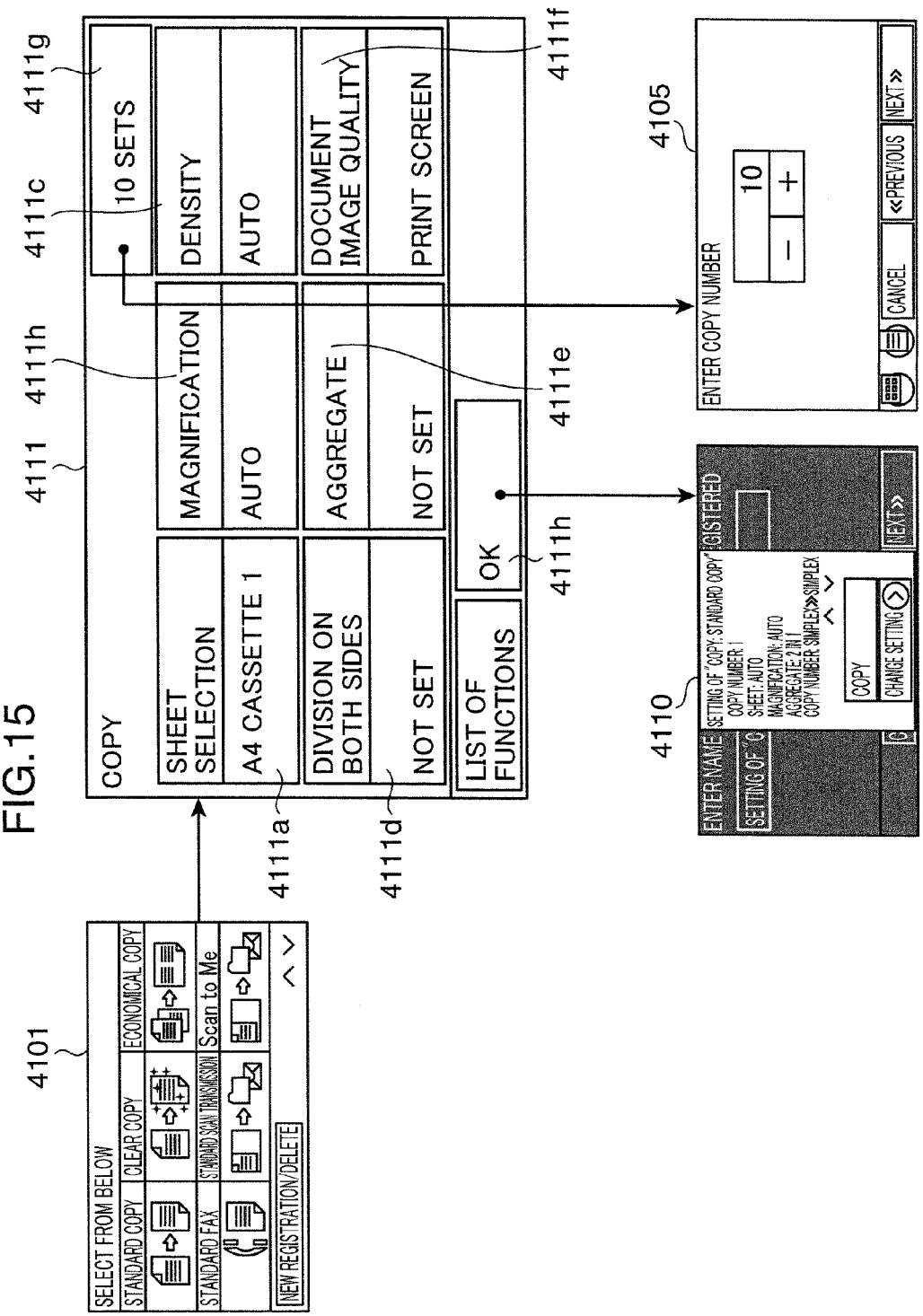
FIG. 15 is a diagram showing transitions of display screens in a menu display format at the time of workflow calling for the copy function.

Next, the workflow calling process in the multi function peripheral 1 is described. FIGS. 11 and 12 are a flow chart showing the workflow calling process in the multi function peripheral 1. FIG. 13 is a diagram showing transitions of display screens in the wizard display format at the time of workflow calling for the copy function. FIG. 14 is a diagram showing transitions of display screens in the list display format at the time of workflow calling for the copy function. FIG. 15 is a diagram showing transitions of display screens in the menu display format at the time of workflow calling for the copy function. Note that operations similar to those at the time of workflow generation and registration shown in FIGS. 4 and 5 are not described.

When the main power supply of the multi function peripheral 1 is turned on by the user, the display controller 522 causes the display section 410 to display a predetermined initial screen 4100 (S21).

When the workflow button 450 of the operating unit 400 is depressed by the user during the display of this initial screen 410 and a workflow start instruction is received by the instruction receiver 523 (YES in S22), the display controller 522 causes a workflow screen 4101 (FIG. 13) to be displayed (S23). Workflow images 4101a to 4101f indicating the respective workflows stored (registered) in the storage 54 are displayed on the workflow screen 4101.

Here, the operations in S5 to S16, S18 and S19 shown in FIGS. 4 and 5 are performed when the new registration/ deletion button 4101g is pressed by the user. Since these operations are as shown in FIGS. 4 and 5, they are not described here.

When any one of the workflow images 4101a to 4101f displayed on the workflow screen 4101 is pressed by the user during the display of the workflow screen 4101 and a workflow selection instruction to select a workflow applied for the execution of the function (e.g. the copying operation) of the multi function peripheral 1 is received from the user (YES in S24), the display controller 522 reads the selected workflow from the storage 54 and discriminates the display format indicated by this workflow based on display format information (display format received in S10 and S11 shown in FIG. 4) possessed by the read workflow (S25).

When the display controller 522 decides the display format indicated by the read workflow is discriminated to be the wizard display format (YES in S25), the display controller 522 causes the display section 410 to successively display reception screens (e.g. reception screen 4105 shown in FIG. 13) for the respective settings (e.g. copy number, sheet size, magnification, density, aggregate print, document image quality, division on both sides, etc. in the case of the copy function) on the function indicated by the read workflow together with a display format change instruction receiving button 4105a and a confirmation screen display instruction receiving button 4105b.

The display format change instruction receiving button 4105a is a button for receiving an instruction to switch the display format of the display section 410 to another display format from the user. This display format change instruction receiving button 4105a is displayed, for example, as on the reception screen 4105 of FIG. 13.

The confirmation screen display instruction receiving button 4105b is a button for receiving an instruction to display a confirmation screen in such a list display format that the setting contents registered in the read workflow can be confirmed from the user. This confirmation screen display instruction receiving button 4105b is displayed, for example, as on the reception screen 4105 of FIG. 13.

Upon switching the display to each reception screen, the display controller 522 switches the display of the display section 410, for example, such that each reception screen gradually slides rightward from the left part of the display area of the display section 410 or leftward from the right part of the display area of the display section 410 to appear in the display area of the display section 410 and finally this reception screen is entirely displayed.

Upon switching the display to the confirmation screen, the display controller 522 switches the display of the display section 410, for example, such that the confirmation screen gradually slides downward from the upper part of the display area of the display section 410 or upward from the lower part of the display area of the display section 410 to appear in the display area of the display section 410 and finally the confirmation screen is entirely displayed.

In other words, the display controller 522 allows the user to recognize that a required operation is different depending on how the screen display is switched (by visual effect) by switching the screen of the display section 410 in a lateral direction when the user is guided to enter setting contents in a procedure according to the workflow or an operation of entering the setting contents continues while switching the screen of the display section 410 in a vertical direction when the entry of the setting contents is completed and confirmation is sought.

When the instruction receiver 523 receives a confirmation screen display instruction from the user by the touch panel function based on an operation of pressing the confirmation screen display instruction receiving button 4105b by the user during the display of the reception screen for each setting (YES in S27), the display controller 522 causes the display section 410 to display a confirmation screen in the list display format corresponding to the pressed confirmation screen display instruction receiving button 4105b (S41). Also upon switching the display to this confirmation screen, the display controller 522 switches the display of the display section 410 such that the confirmation screen gradually slides downward from the upper part of the display area of the display section 410 or upward from the lower part of the display area of the display section 410 to appear in the display area of the display section 410 and finally the confirmation screen is entirely displayed as described above. Note that the contents of the respective settings already registered in the workflow by the user are displayed on this confirmation screen. Thereafter, the process proceeds to S31.

When the instruction receiver 523 receives the display format change instruction from the user by the touch panel function based on the operation of pressing the display format change instruction receiving button 4105a by the user during the display of the reception screen for each setting (NO in S27, YES in S44), the display controller 522 causes the display section 410 to display a display format selection screen for prompting the user to select the display format (S45). A button for receiving an instruction to select either one of the two display formats different from that used for display on the display section 410 up to this point of time is caused to be displayed on this display format selection screen by the display controller 522. When either one of the display formats is selected by the touch panel function as a result of the button operation of the user during the display of this display format selection screen, the display controller 522 sets the selected display format as the one used for display on the display section 410 (S46). Thereafter the process is returned to S25.

On the other hand, the content of the setting is changed to a designated one (S29), when the instruction receiver 523 receives no instruction from the user based on the pressing operation of the display format change instruction receiving button 4105a and the confirmation screen display instruction receiving button 4105b by the user during the display of the reception screen for each setting (No in S27, NO in S44) and content designation (e.g. specific number of the copy number) for the setting being guided on this reception screen by the touch panel function based on the operation of the operation buttons displayed on this reception screen (4105c, 4105d of the reception screen 4105 shown in FIG. 13) or the numerical pad 433 and the like by the user is received (YES in S28).

The display controller 522 repeats the display of the reception screens and the reception of the setting contents until the reception screens for all the settings on the function indicated by the read template are displayed (S30), and causes the display section 410 to display a confirmation screen 4110 including an image 4110a displaying a list of setting contents (contents of the respective settings received by the instruction receiver 523 in S28) having received up to this point of time, a function execution button 4110b for receiving a function execution instruction to execute the function with the listed contents of the respective settings and a setting change button 4110c for receiving an instruction to change the listed contents of the respective settings (S31), when the display of the reception screens and the reception of the setting contents for all the settings are completed (NO in S30). If the display of the reception screens and the reception of the setting contents for all the settings are not completed yet (YES in S30), the process is returned to S26.

If the display format indicated by the selected workflow is the menu display format in S25 (NO in S25, YES in S34), the display controller 522 causes the display section 410 to display a menu display screen 4111 for displaying images 4111a to 4111g indicating the contents of the respective settings on one screen as shown in FIG. 15 (S35).

For this menu display screen 4111, the display data for the initial screen 4100 shown in FIG. 8 can be commonly used. The display controller 522 can generate the menu display screen 4111 by adding an image of an OK button 4111h possessed beforehand to the initial screen 4100.

When the setting whose content is to be changed is received from the user by the instruction receiver 523 by the touch panel function through the pressing of any one of the images 4111a to 4111g by the user during the display of this menu display screen 4111 (YES in S36), the display controller 522 causes the display section 410 to display a reception screen (e.g. reception screen 4105 shown in FIG. 15) corresponding to this selected setting (S37). Thereafter, when content designation (e.g. specific number of the copy number) for the setting being guided on this reception screen is received (YES in S38), the content of the setting is changed to the designated content (S39). Display transition from the menu display screen 4111 to the reception screen and the reception of the content designation for the setting being guided on the reception screen are possible for all the settings displayed on the menu display screen 4111. The reception screens displayed after the transition from the menu display screen 4111 are similar to the reception screens used in the wizard display format. In other words, the display controller 522 commonly uses the reception screens for the respective settings stored in the storage 54 for display in the wizard display format and display in the menu display format. Thus, although not particularly shown in FIGS. 11 and 12, a display format change instruction receiving button is also displayed on each reception screen displayed, for example, upon the transition from the menu display screen 4111. When receiving a display format change instruction from the user by the pressing of the display format change instruction receiving button by the user, the display controller 522 changes the display format (menu display format) applied for display at this point of time to another display format corresponding to the pressed display format change instruction receiving button. In the flow chart shown in FIGS. 11 and 12, operations after the change of the display format are started while being transferred to those corresponding to the screen display in the display format after the change.

After the setting contents are changed, the display controller 522 causes the display section 410 to display the menu display screen 4111 again. When the OK button 4111h displayed on the menu display screen 4111 is pressed by the user, the process proceeds to S31.

When the display format indicated by the selected workflow is not the menu display format, but the list display format (NO in S34), the display controller 522 causes the display section 410 to display the confirmation screen 4110 including the image 4110a displaying a list of contents of the respective settings received by the instruction receiver 523 in S28, the function execution button 4110b and the setting change button 4110c (S31).

When the function execution button 4110b is pressed by the user during the display of this confirmation screen 4110 and an instruction to execute the function with the listed contents of the respective settings is received by the instruction receiver 523 ("FUNCTION EXECUTION INSTRUCTION" in S32), the operation controller 521 executes the function (such as the copying operation) with the listed contents of the respective settings (S33).

When the setting change button 4110c is pressed by the user during the display of the confirmation screen 4110 and the setting change instruction to change the listed contents of the respective settings is received by the instruction receiver 523 ("SETTING CHANGE INSTRUCTION" in S32), the display controller 522 returns the process to S35 if display has been thus far made either in the menu display format or in the list display format (YES in S43). The display controller 522 returns the process to S26 if display has been thus far made in the wizard display format (NO in S43). The process may be returned to S35 even if NO in S43.

Figure 16:
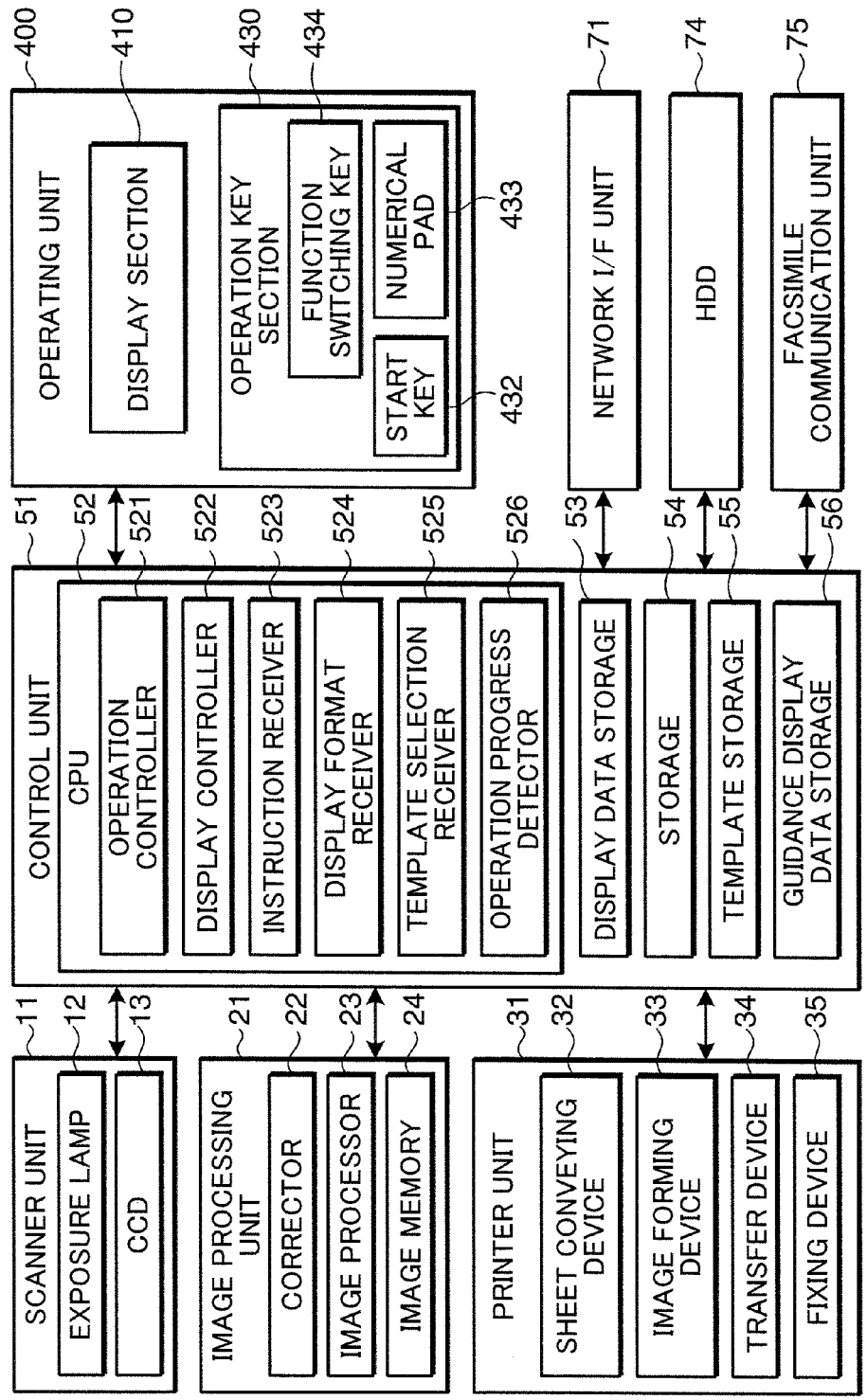
FIG. 16 is a control block diagram of the multi function peripheral for performing a guidance display process according to an operation progress.

At the time of workflow generation and registration and workflow calling by the multi function peripheral 1, it is also possible to display guidance according to an operation progress in function setting by the user. A control block diagram of the multi function peripheral 1 for performing a guidance displaying process according to this operation progress is shown in FIG. 16. Note that parts of the construction similar to those shown in FIG. 3 are not described.

The multi function peripheral 1 in this case is such that the CPU 52 of the control unit 51 further includes an operation progress detector 526. The operation progress detector 526 detects an operation progress by the user when the instruction receiver 523 receives an instruction on the respective setting contents of the function from the user. For example, the operation progress detector 526 detects as this operation progress (1) an erroneous entry number of this instruction by the user, (2) an erroneous entry frequency or (3) a time required for the user to designate the content of each setting.

Further, the control unit 51 includes a guidance display data storage 56. The guidance display data storage 56 stores a guidance display data used to display operation guidance corresponding to each operation progress detected by the operation progress detector 526 for each operation progress. The display controller 522 reads the guidance display data corresponding to the operation progress detected by the operation progress detector 526 from the guidance display data storage 56 and causes the display section 410 to display it.

Figure 17:
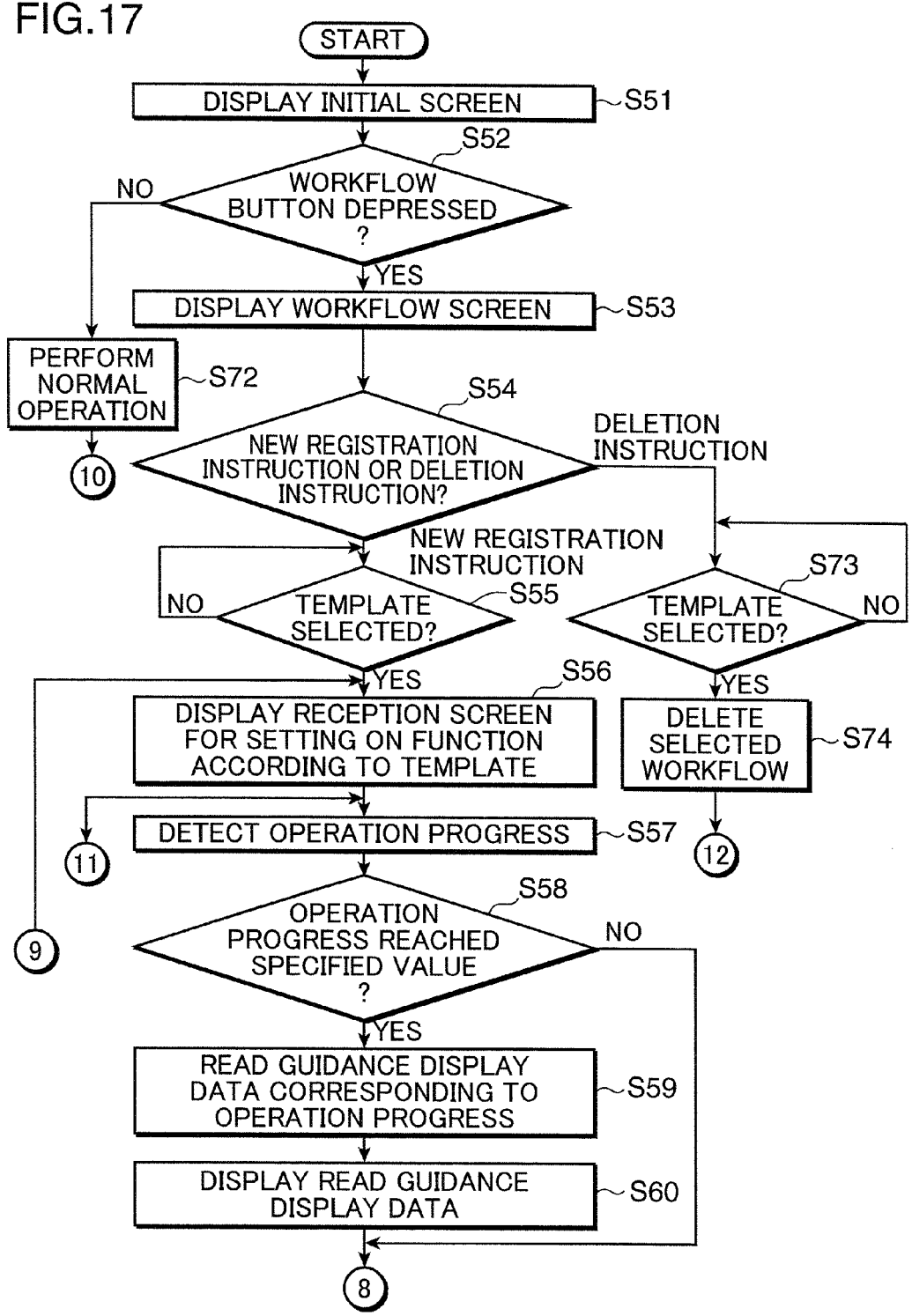
FIGS. 17 and 18 are a flow chart showing a process at the time of workflow generation and registration in the multi function peripheral.
Figure 18:
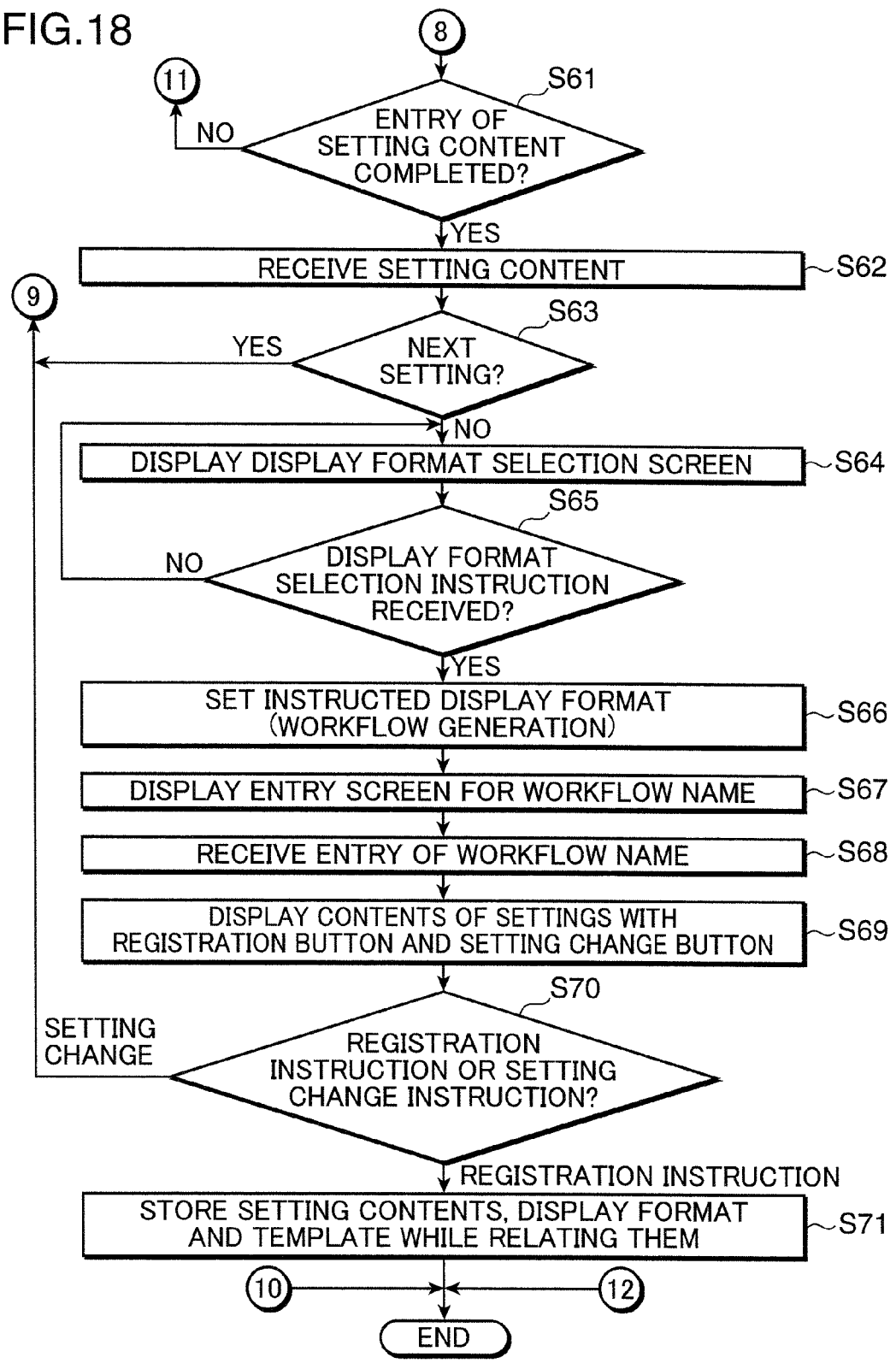
Figure 19:
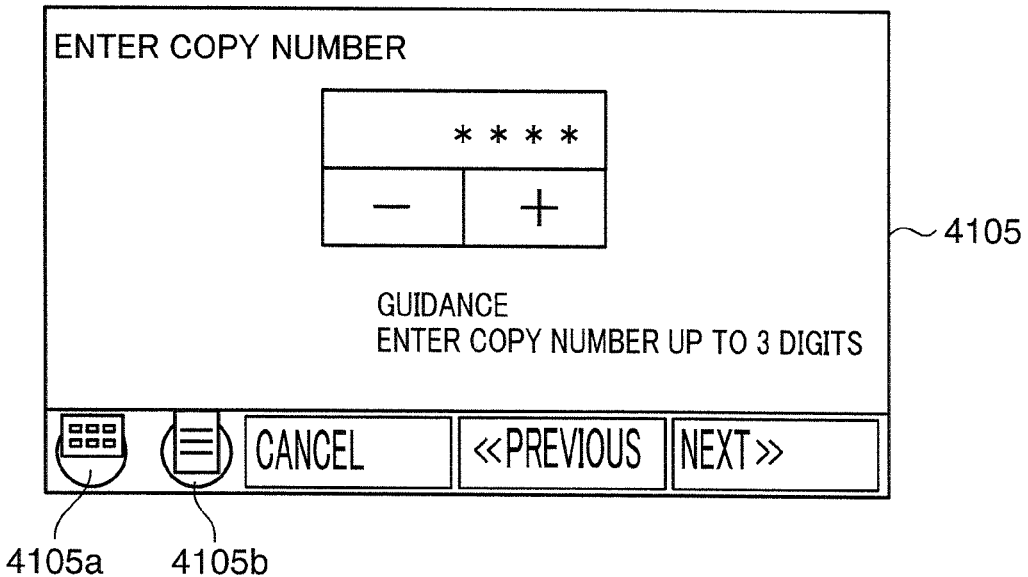
FIG. 19 is a diagram showing an exemplary display screen at the time of displaying operation guidance.
Figure 20:
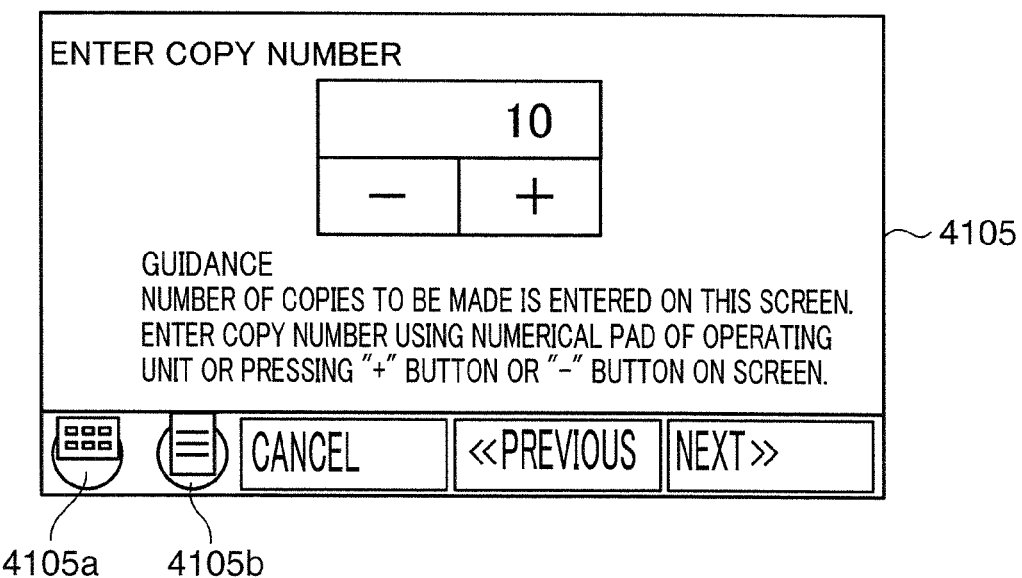
FIG. 20 is a diagram showing another exemplary display screen at the time of displaying operation guidance.

Next, a process at the time of workflow generation and registration in this multi function peripheral 1 is described. FIGS. 17 and 18 are a flow chart showing the process at the time of workflow generation and registration in the multi function peripheral 1. FIGS. 19 and 20 are diagrams showing exemplary display screens at the time of displaying operation guidance. Note that operations similar to those shown in FIGS. 4 and 5 are not described here.

When any one of the images T1 to T6 indicating the templates is pressed by the user during the display of the template selection screen 4104 and selection of the template used for workflow generation is received by the instruction receiver 523 (YES in S55), the display controller 522 causes the display section 410 to successively display reception screens for the respective settings of the function indicated by the selected template (S56). When the instruction receiver 523 starts receiving content designation on the setting being guided on the displayed reception screen based on operation by the user, the operation progress detector 526 detects, for example, the number of erroneous entries of designation of the content of the each setting by the user (e.g. the number of entries such as the entry of a copy number which cannot be set, the number of returns to the previous screen), an erroneous entry frequency (the number of erroneous entries made within a predetermined period (e.g. 1 min.)) or a time required for the user to designate the content of each setting (e.g. time during which no entry is made after the reception screen is displayed) (S57).

The display controller 522 judges whether or not the operation progress detected by the operation progress detector 526 has reached a predetermined value (e.g. the erroneous entry number during the display of one reception screen has reached 3, the number of returns to the previous screen for one reception screen has reached 5 or the time during which no entry is made after the display of the reception screen has reached 2 min.) (S58). If the operation progress has reached the predetermined value (YES in S58), the display controller 522 reads a guidance display data (guidance display data corresponding to the number of erroneous entries and the duration of the time during which no entry is made) corresponding to the operation progress from the guidance display data storage 56 (S59) and causes the display section 410 to display the read guidance display data (S60). Unless the operation progress has reached the predetermined value (NO in S58), operations in S59 and S60 are skipped.

For example, if it is detected as an operation progress by the operation progress detector 526 that the user has entered the copy number, which cannot be set, by a predetermined number of time (three times) when the reception screen used to set the copy number at the time of the copy function is displayed on the display section 410, the display controller 522 reads a guidance display data corresponding to this operation progress from the guidance display data storage 56 and causes the display section 410 to show a guidance display showing a message or the like to the effect that "ENTER COPY NUMBER UP TO 3 DIGITS" as shown in FIG. 19.

For example, if it is detected as an operation progress by the operation progress detector 526 that the user has not entered the copy number for a predetermined period (e.g. 2 min.) when the reception screen used to set the copy number at the time of the copy function is displayed on the display section 410, the display controller 522 reads a guidance display data corresponding to this operation progress from the guidance display data storage 56 and causes the display section 410 to show a guidance display showing a message or the like to the effect that "COPY NUMBER IS TO BE ENTERED ON THIS SCREEN. ENTER COPY NUMBER USING NUMERICAL PAD OF OPERATING UNIT, "+" BUTTON OR "−" BUTTON ON SCREEN" as shown in FIG. 20.

When the entry of the content designation (e.g. specific number of the copy number) on the setting being guided on the reception screen is completed by the touch panel function based on the operation of the operation button displayed on the reception screen by the user during the display of the reception screen on each setting (YES in S61), the instruction receiver 523 receives the entered setting content (S62). The succeeding operations are similar to those shown in FIGS. 4 and 5.

Next, a process at the time of workflow calling in this multi function peripheral 1 is described. FIGS. 21 and 22 are a flow chart showing the process at the time of workflow calling in the multi function peripheral 1. Note that operations similar to those shown in FIGS. 4, 5, 11 and 12 are not described here.

When the instruction receiver 523 starts receiving content designation on the setting being guided on the reception screen and a change of the display format is started in the wizard display format or the menu display format based on the operation of the operation button displayed on the reception screen by the user (S85, S101), the operation progress detector 526 detects the number or frequency of erroneous entries of the designation by the user, or a time required for the user to designate the content of each setting for the entry of the content of each setting (S86, S102).

The display controller 522 judges whether or not the operation progress detected by the operation progress detector 526 has reached a predetermined value (S87, S103). If the operation progress has reached the predetermined value (YES in S87, YES in S103), the display controller 522 reads a guidance display data corresponding to the operation progress from the guidance display data storage 56 (S88, S104) and causes the display section 410 to display the read guidance display data (S89, S105).

The display controller 522 may cause a guidance instruction button for receiving an instruction to the effect of showing the above guidance display from the user to be displayed on the reception screen of each setting content at the time of workflow generation and registration and workflow calling, may receive an instruction to the effect of showing the guidance display by the touch panel function when the guidance instruction button is pressed by the user, and may show the above guidance display (e.g. guidance display shown in FIG. 20) based on the instruction from the user. In this case, the display controller 522 may receive the instruction to the effect of showing the guidance display based on the depression of the help key 431 of the operating unit 400. Further, when the guidance instruction button or the help key 431 is successively pressed twice, for example, during the guidance display shown in FIG. 19, the display controller 522 may show a guidance display for further explanation as shown in FIG. 20.

When the entry of an instruction to change the display format or that of content designation on the setting being guided on the reception screen is completed based on the operation of the operation button displayed on the reception screen by the user during the display of the reception screen for each setting (YES in S91, YES in S106), the instruction receiver 523 changes the setting to the received content (S92, S107). The succeeding operations are similar to those shown in FIGS. 11 and 12.

The present invention is not limited to the constitution of the above embodiments and various changes can be made. The above constructions and processes shown in FIGS. 1 to 22 are merely examples of the embodiments of the present invention and not of the nature to limit the present invention to the above embodiments.

For example, in the above embodiments, the display format received from the user by the display format receiver 524 and the template received by the template selection receiver 525 are stored in the storage 54 while being related to the contents of the respective settings needed to be registered for the execution of the function such as the copying operation or the scanning operation and received from the user by the instruction receiver 523. However, without using the template, the display format received from the user by the display format receiver 524 may be stored in the storage 54 while being related to the contents of the respective settings needed to be registered for the execution of the function such as the copying operation or the scanning operation and received from the user by the instruction receiver 523.

For example, an example of the electrical apparatus according to the present invention is an image forming apparatus, i.e. the multi function peripheral 1 in the above respective embodiments. The electrical apparatus according to the present invention is not limited to the multi function peripheral and may be another image forming apparatus (copier, facsimile machine, scanner, printer, etc.) or may be another electrical apparatus different from the image forming apparatus such as a washing machine, a rice cooker or an audio apparatus.

In short, the present invention is directed to an operating device, comprising a display controller for causing a display section of an electrical apparatus to display reception screens for respective settings on functions executable in the electrical apparatus; an instruction receiver for receiving an instruction to designate a content of each setting from the user during the display of the reception screen for each setting by the display controller; a display format receiver for receiving a display format selection instruction from the user to select a user's desired display format from at least two of a wizard display format for successively interactively displaying the contents of the respective settings received by the instruction receiver, a list display format for displaying a list of the contents of the respective settings received by the instruction receiver and a menu display format for displaying images indicating contents of the respective settings received by the instruction receiver on one screen; and a storage for storing the display format received by the display format receiver while relating it to the contents of the respective settings received by the instruction receiver.

The present invention is also directed to an image forming apparatus as the electrical apparatus, comprising the display section and the operating device.

For example, in the case of registering contents of settings in accordance with guidance in the wizard display format as the conventional technology described in "Description of the Background Art", guidance of even setting items, which need not be changed by the user, is displayed since this wizard display format displays guidance of all the setting items to be registered for the user. Thus, if there are some setting items, which need not be changed by the user, guidance by this wizard display format rather increases operation steps.

Contrary to this, according to the present invention, the user can select any one of the wizard display format, the list display format and the menu display format as the display format for the designated contents of the respective settings when the user designates the contents of the respective settings on the instruction receiver. Thus, avoidance of redundant operation guidance or conversely customization such as display of the operation guidance for confirmation becomes possible in view of necessity to change the setting contents at the time of executing the function by applying the contents of the respective settings stored in the storage through designation by the user on the instruction receiver.

Thus, according to the present invention, when the user stores contents of settings on a function in an electrical apparatus such as an image forming apparatus, it is possible to reduce guidance display unnecessary for the user while showing user-friendly guidance display on a display section and to further improve operability when the user stores function settings.

The display controller preferably displays the reception screen for each setting in the wizard display format.

According to this invention, operability when the user designates the content of each setting on the instruction receiver is improved since the display controller displays the reception screen of each setting in the wizard display format.

The display controller preferably causes the display section to display a setting change image for receiving a setting change instruction to change the respective settings when the reception of the contents of the respective settings by the instruction receiver is completed, and causes the display section to display the reception screen for each setting again when the setting change instruction is received by the instruction receiver during the display of the setting change image.

According to this invention, the reception screen for each setting is displayed again on the display section when the setting change instruction is received by the instruction receiver during the display of the setting change image. Thus, the user can designate the content of each setting on the instruction receiver again by a simple operation such as when finding an error or the like in the designated content after the contents of the respective settings are designated on the instruction receiver.

Preferably, the operating device further comprises a fixed form storage for storing a plurality of fixed forms each composed of a combination of the respective settings on the functions executable in the electrical apparatus and a fixed form selection receiver for receiving selection of a desired fixed form from the fixed forms stored in the fixed form storage from the user; the display controller causes the display section of the electrical apparatus to display the reception screen for each setting of the selected fixed form when selection of the fixed form is received by the fixed form selection receiver; and the storage stores the display format received by the display format receiver and the fixed form received by the fixed form selection receiver while relating them to the contents of the respective settings received by the instruction receiver.

In this invention, it is sufficient for the user to designate the contents of the respective settings according to the reception screens for the respective settings of the fixed form selected by the fixed form selection receiver when the contents of the respective settings are designated on the instruction receiver. Thus, operability at the time of designating the contents of the respective settings is further improved.

Preferably, the display controller switches the display of the display section such that each reception screen gradually slides in a predetermined first direction in a display area of the display section to appear in the display area of the display section and the entire reception screen is displayed in the display area when the display of the display section is switched to each reception screen according to the selected fixed form; and the display controller further switches the display of the display section such that a list display image indicating the contents of the received settings gradually slides in a predetermined second direction different from the first direction in the display area of the display section to appear in the display area of the display section and the entire list display image is displayed in the display area when reception of the settings on the respective reception screens for displaying according to the selected fixed form is completed.

According to this invention, the display controller can allow the user to recognize that a required operation is different depending on how screen display is switched (by visual effect) by switching the screen of the display section in the predetermined first direction when the user is guided to enter setting contents in a procedure according to the fixed form or an operation of entering the setting contents continues while switching the screen of the display section in the predetermined second direction when the entry of the setting contents is completed and the received setting contents are displayed in a list.

Preferably, the display controller causes the display section to display a deletion instruction reception image for receiving a deletion instruction to delete the contents of the respective settings stored in the storage and the fixed form and the display format related to these contents; and the contents of the respective settings and the fixed form and the display format related to these contents are deleted from the storage when the instruction receiver receives the deletion instruction from the user during the display of the deletion instruction reception image.

According to this invention, the contents of the respective settings and the like are deleted from the storage when the deletion instruction to delete the contents of the respective settings and the fixed form and the display format related to these contents is received from the user by the instruction receiver during the display of the deletion instruction reception image by the display controller. Thus, the user can delete the once stored contents of the respective settings and the fixed form and the display format related to these contents from the storage by a simple operation.

Preferably, the operating device further comprises an operation progress detector for detecting an operation progress by the user at the time of receiving the instruction by the instruction receiver, and a guidance display data storage for storing a guidance display data used to display operation guidance corresponding to each operation progress detected by the operation progress detector for each operation progress; and the display controller reads the guidance display data corresponding to the operation progress detected by the operation progress detector from the guidance display data storage and causes the display section to display the read guidance display data.

According to this invention, user-friendly guidance display corresponding to the user's skill in user operation can be shown since the display controller reads the guidance display data corresponding to the operation progress detected by the operation progress detector from the guidance display data storage and causes the display section to display the read guidance display data.

Thus, according to the present invention, it is possible to reduce guidance display unnecessary for the user while showing user-friendly guidance display according to the skill of the user in the operation when the user registers function settings in an electrical apparatus such as an image forming apparatus, wherefore operability when the user registers the function settings can be further improved.

The present invention is also directed to an operating device, comprising a display controller for causing a display section of an electrical apparatus to display reception screens for respective settings on functions executable in the electrical apparatus; a storage for storing any one of a wizard display format for successively interactively displaying contents of the respective settings, a list display format for displaying a list of the contents of the respective settings and a menu display format for displaying images indicating the contents of the respective settings on one screen while relating it to the contents of the respective settings based on selection of the display format by a user; and a start instruction receiver for receiving a reception start instruction for contents of the respective settings on the function executable in the electrical apparatus from the user, wherein the display controller causes the display section to display a reception screen for each setting on the function executable in the electrical apparatus in the display format stored in the storage while being related to the contents of the respective settings when the reception start instruction is received by the start instruction receiver.

In this invention as well, the reception screen for each settings on the function executable in the electrical apparatus is displayed in the display format which is any one of the wizard display format, the list display format and the menu display format and selected by the user. Thus, the user can perform an operation of storing the contents of the respective settings on the function in the electrical apparatus while preventing redundant operation guidance or conversely preventing the operation guidance from being displayed again for confirmation according to the user' preference in view of necessity to change the contents of the respective settings at the time of executing the function of the electrical apparatus.

Thus, according to this invention, it is possible to reduce guidance display unnecessary for the user while showing guidance display on the display section when the user registers function settings in an electrical apparatus such as an image forming apparatus. It is also possible to further improve operability when the user registers the function settings.

Preferably, the operating device further comprises an instruction receiver for receiving a display format charge instruction from the user to select any one of the wizard display format, the list display format and the menu display format and change the display format to the selected one, and the display controller changes the display format on the display section to the display format indicated by the received display format change instruction when the display format change instruction is received by the instruction receiver.

According to this invention, operability when the user registers the function settings can be further improved since the user can change the display format of the contents of the respective settings displayed on the display section to a desired display format according to his own operation skill, an operating status and the like.

Preferably, the operating device further comprises a display data storage for storing display data used to display the reception screens for the respective settings on the display section; and the display controller forms display screens at the time of the wizard display format and the menu display format as the reception screens for the respective settings in the wizard display format and the menu display format by commonly using the same display data stored in the display data storage.

In this invention, display in the wizard display format and display in the menu display format can be shown without increasing the number of the display data since the display screens in the wizard display format and the menu display format are formed by commonly using the same display data.

Preferably, the display controller causes the display section to display a setting change image for receiving a setting change instruction to change the contents of the respective settings when the contents of the respective setting are displayed in any one of the display formats, and causes the display section to display the reception screen for each setting when the instruction receiver receives the setting change instruction from the user during the display of the setting change image.

According to this invention, the user can designate the content of the setting again by a simple operation such as when finding an error or the like in the content of the setting since the display controller causes the display section to display the reception screen for each setting when the setting change instruction is received by the instruction receiver during the display of the setting change image.

Preferably, the display controller causes the display section to display a function execution instruction reception image for receiving a function execution instruction to execute the function with the contents of the respective settings displayed on the display section together with the setting change image.

According to this invention, the user can easily cause the electrical apparatus to execute the function with the contents of the respective settings by performing an operation based on the function execution instruction reception image after the contents of the respective settings are confirmed in any one of the display formats.

Preferably, the display controller switches the display of the display section such that each reception screen gradually slides in a predetermined first direction in a display area of the display section to appear in the display area of the display section and the entire reception screen is displayed in the display area when the reception screen for each setting is displayed on the display section of the electrical apparatus in accordance with the wizard display format and the display of the display section is switched to each reception screen; and the display controller further switches the display of the display section such that a list display image indicating the contents of the received settings gradually slides in a predetermined second direction different from the first direction in the display area of the display section to appear in the display area of the display section and the entire list display image is displayed in the display area when reception of the settings on the respective reception screens is completed.

According to this invention, the display controller can allow the user to recognize that a required operation is different depending on how screen display is switched (by visual effect) by switching the screen of the display section in the predetermined first direction when the user is guided to enter setting contents in a procedure according to the wizard display format or an operation of entering the setting contents continues while switching the screen of the display section in the predetermined second direction when the entry of the setting contents is completed and the received setting contents are displayed in a list.

Preferably, the operating device further comprises an instruction receiver for receiving an instruction from the user to designate contents of the respective settings by the user when a reception start instruction is received by the start instruction receiver and the display controller causes the display section to display the respective settings on the function corresponding to the reception start instruction in the display format stored in the storage while being related to the respective settings; an operation progress detector for detecting an operation progress by the user at the time of receiving the instruction by the instruction receiver; and a guidance display data storage for storing a guidance display data used to display operation guidance corresponding to each operation progress detected by the operation progress detector for each operation progress; and the display controller reads the guidance display data corresponding to the operation progress detected by the operation progress detector from the guidance display data storage and causes the display section to display the read guidance display data.

According to this invention, user-friendly guidance display corresponding to the user's skill in user operation can be shown since the display controller reads the guidance display data corresponding to the operation progress detected by the operation progress detector from the guidance display data storage and causes the display section to display the read guidance display data.

Thus, according to the present invention, it is possible to reduce guidance display unnecessary for the user while showing user-friendly guidance display according to the skill of the user in the operation when the user registers function settings in an electrical apparatus such as an image forming apparatus, wherefore operability when the user registers the function settings can be further improved.

Preferably, the operation progress detected by the operation progress detector is the number or frequency of erroneous entries of the instruction by the user.

Preferably, the operation progress detected by the operation progress detector is a time required for the user to designate the content of each setting.

According to these inventions, there can be shown user-friendly guidance display specifically considering the skill of the user in user operation.

This application is based on Japanese Patent application serial Nos. 2009-200957, 2009-200958 and 2009-200959 filed in Japan Patent Office on Aug. 31, 2009, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image forming apparatus capable of operating a workflow that executes a function of the image forming apparatus with contents of respective settings set beforehand by a user, the workflow comprises a first workflow, a second workflow and a third workflow, the image forming apparatus comprising:

a display section;

a display controller for causing the display section to display reception screens for the respective settings;

a storage for storing setting contents to be contents of the respective settings of the workflow set beforehand by the user relating to any one of a wizard display format for successively interactively displaying the setting contents, a list display format for displaying a list of the setting contents and a menu display format for displaying images indicating the setting contents on one screen based on selection of the display format by a user, the storage stores the setting contents of the first workflow relating to the wizard display format, the setting contents of the second workflow relating to the list display format and the setting contents of the third workflow relating to the menu displayed format; and an instruction receiver for receiving a display format change instruction from the user to select any one of the wizard display format, the list display format and the menu display format and change the display format to the selected one; wherein the display controller causes the display section to display a screen with images indicating the respective workflows, and to display a reception screen for each setting indicating the setting contents of the first workflow as the wizard display format when an image selected by a user indicates the first workflow; a reception screen for each setting indicating the setting contents of the second workflow as the list display format when an image selected by a user indicates the second workflow; and a reception screen for each setting indicating the setting contents of the third workflow as the menu display format when an image selected by a user indicates the third workflow in the plurality of images included in the screen that is displayed on the display section;

the display controller causes the display section to display a display format section screen including a button for receiving an instruction to select either one of the two display formats different from that used for display on the display section up to this point of time when the display format change instruction is received by the instruction receiver; and the display controller changes the display format on the display section to the display format indicated by the received display format change instruction when the display format change instruction is received by the instruction receiver.

2. An image forming apparatus according to claim 1, further comprising a display data storage for storing display data used to display the reception screens for the respective settings on the display section, wherein the display controller forms display screens at the time of the wizard display format and the menu display format as the reception screens for the respective settings in the wizard display format and the menu display format by commonly using the same display data stored in the display data storage.

3. An image forming apparatus according to claim 1, wherein the display controller:

causes the display section to display a setting change image for receiving a setting change instruction to change the setting contents when the setting contents are displayed in any one of the display formats, and causes the display section to display the reception screen for each setting when the instruction receiver receives the setting change instruction from the user during the display of the setting change image.

4. An image forming apparatus according to claim 3, wherein the display controller causes the display section to display a function execution instruction reception image for receiving a function execution instruction to execute the function with the contents of the respective settings displayed on the display section together with the setting change image.

5. An image forming apparatus according to claim 1, wherein the display controller:

switches the display of the display section such that each reception screen gradually slides in a predetermined first direction in a display area of the display section to appear in the display area of the display section and the entire reception screen is displayed in the display area when the reception screen for each setting is displayed on the display section in accordance with the wizard display format and the display of the display section is switched to each reception screen, and further switches the display of the display section such that a list display image indicating the contents of the received settings gradually slides in a predetermined second direction different from the first direction in the display area of the display section to appear in the display area of the display section and the entire list display image is displayed in the display area when reception of the settings on the respective reception screens is completed.

6. An image forming apparatus according to claim 1, further comprising:

an instruction receiver for receiving an instruction from the user to designate contents of the respective settings by the user when a user selects anyone of the plurality of images included in the screen that is displayed on the display section and the display controller causes the display section to display the respective settings on the function corresponding to the workflow indicated by the selected image in the display format stored in the storage while being related to the respective settings;

an operation progress detector for detecting an operation progress by the user at the time of receiving the instruction by the instruction receiver; and a guidance display data storage for storing a guidance display data used to display operation guidance corresponding to each operation progress detected by the operation progress detector for each operation progress;

wherein the display controller reads the guidance display data corresponding to the operation progress detected by the operation progress detector from the guidance display data storage and causes the display section to display the read guidance display data.

7. An image forming apparatus according to claim 6, wherein the operation progress detected by the operation progress detector is the number or frequency of erroneous entries of the instruction by the user.

8. An image forming apparatus according to claim 6, wherein the operation progress detected by the operation progress detector is a time required for the user to designate the content of each setting.

* * * * *